(12) United States Patent
Nomura

(10) Patent No.: US 7,965,933 B2
(45) Date of Patent: Jun. 21, 2011

(54) MECHANISM FOR CONTROLLING POSITION OF OPTICAL ELEMENT

(75) Inventor: Hiroshi Nomura, Saitama (JP)

(73) Assignee: Hoya Corporation, Tokyo (JP)

( * ) Notice: Subject to any disclaimer, the term of this patent is extended or adjusted under 35 U.S.C. 154(b) by 141 days.

(21) Appl. No.: 12/263,694

(22) Filed: Nov. 3, 2008

(65) Prior Publication Data
US 2009/0123145 A1 May 14, 2009

(30) Foreign Application Priority Data

Nov. 9, 2007 (JP) .................................. 2007-291656
Jul. 3, 2008 (JP) .................................. 2008-174689

(51) Int. Cl.
*G03B 17/00* (2006.01)
(52) U.S. Cl. .......................................... 396/75; 359/813
(58) Field of Classification Search .................... 396/75, 396/89, 90, 94; 359/811, 813
See application file for complete search history.

(56) References Cited

U.S. PATENT DOCUMENTS

| 4,857,794 A * | 8/1989 | Watanabe .................... 313/113 |
| 2004/0051969 A1 | 3/2004 | Nomura |
| 2004/0141737 A1 | 7/2004 | Nomura |
| 2004/0151490 A1 | 8/2004 | Nomura |
| 2005/0286352 A1 * | 12/2005 | Inui ........................... 369/44.11 |
| 2006/0274435 A1 | 12/2006 | Nomura et al. |
| 2007/0019304 A1 | 1/2007 | Nomura |

FOREIGN PATENT DOCUMENTS

| JP | 7-140368 A | 6/1995 |
| JP | 2000-206391 | 7/2000 |
| JP | 2004-240360 A | 8/2004 |
| JP | 2007-133262 A | 5/2007 |

OTHER PUBLICATIONS

English machine translation of Tanaka, JP 07-140368.*
English language Abstract of JP 7-140368 A, Jun. 2, 1995.
English language Abstract of JP 2004-240360 A, Aug. 26, 2004.
English language Abstract of JP 2007-133262 A, May 31, 2007.
English language Abstract of JP 2000-206391, Jul. 28, 2000.
U.S. Appl. No. 12/263,910 to Nomura, which was filed Nov. 3, 2008.

* cited by examiner

*Primary Examiner* — Clayton E Laballe
*Assistant Examiner* — Autumn Parker
(74) *Attorney, Agent, or Firm* — Greenblum & Bernstein P.L.C.

(57) ABSTRACT

An optical element position control mechanism includes an optical element holding member which holds an optical element of a photographing system and is guided in an optical axis direction; a drive mechanism for moving the optical element holding member in the optical axis direction; and a biasing device including an arm which is swingable about a swing axis, the swing axis being substantially orthogonal to the optical axis, and the arm extending substantially orthogonal to the swing axis and having a free end portion which engages with the optical element holding member to bias the optical element holding member in the optical axis direction.

18 Claims, 25 Drawing Sheets

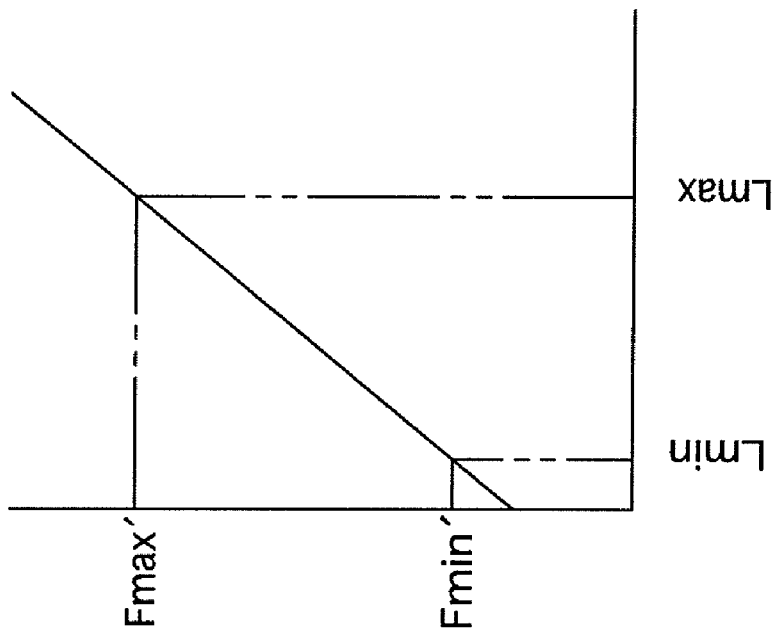
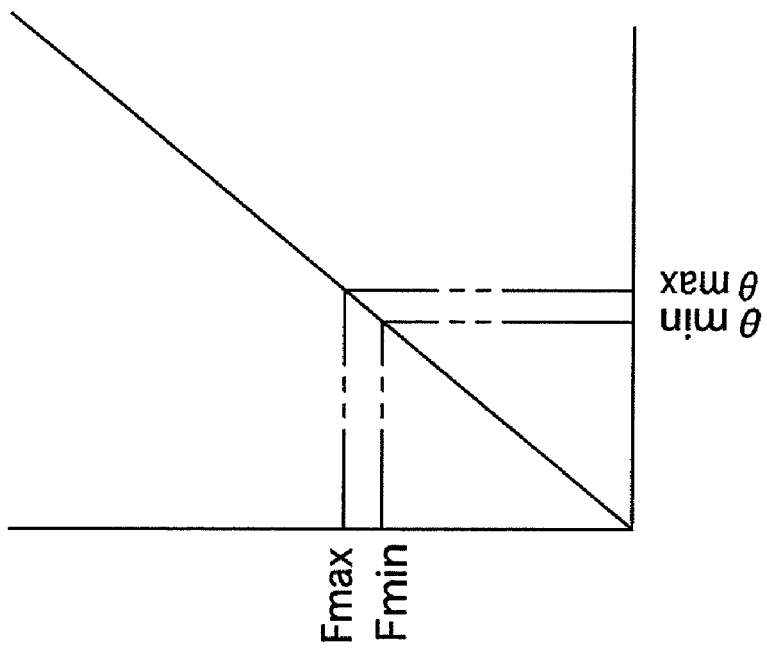

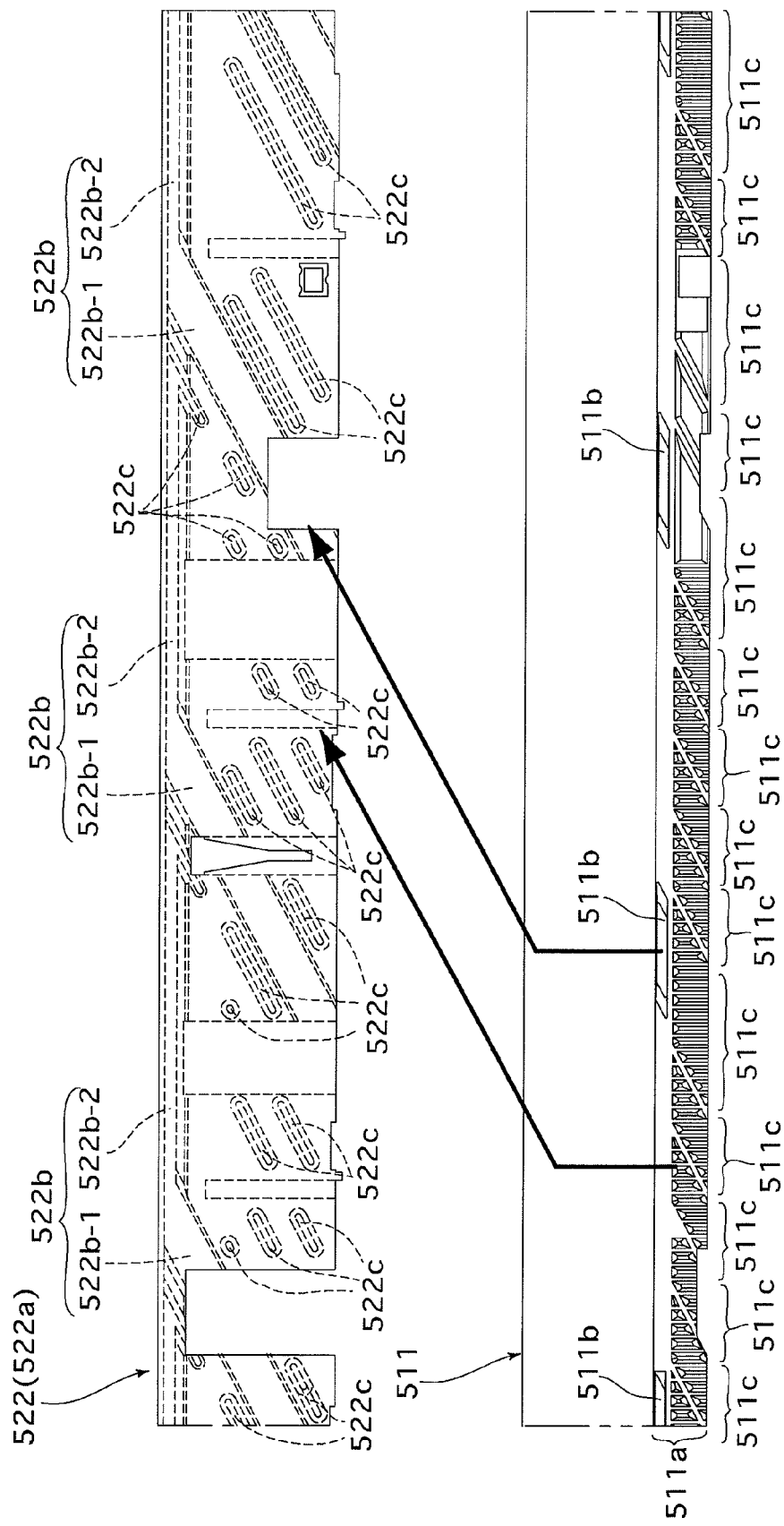

MECHANISM FOR CONTROLLING POSITION OF OPTICAL ELEMENT

BACKGROUND OF THE INVENTION

1. Field of the Invention

The present invention relates to a mechanism for controlling the position of an optical element in an optical apparatus, more specifically to a structure which provides an optical element holding member, movable in an optical axis direction, with a biasing force in the moving direction of the optical element holding member.

2. Description of the Related Art

In optical apparatuses such as cameras, it is often the case that a biasing force in an optical axis direction is imparted to an optical element holding member which holds an optical element and can move in the optical axis direction for the purpose of providing the optical element holding member with a role in functioning as a part of the drive mechanism for driving the optical element holding member, eliminating backlash in the drive mechanism or stabilizing the position of the optical element holding member. The biasing device for biasing the optical element holding member is usually made of an extension or compression spring which is installed so that the axis thereof extends in the optical axis direction. This configuration is disclosed in, e.g., Japanese Unexamined Patent Publication 2000-206391.

In the structure for installation of the extension or compression spring that has been widely used as a biasing device for biasing the optical element holding member, one and the other ends of the spring are respectively engaged with the optical element holding member and a separate support member (e.g., a stationary member) which is not moved with the optical element holding member so that the amount of movement of the optical element holding member directly influences on the amount of extension of the spring. The variation range of the spring load increases as the amount of extension of the spring increases.

Meanwhile, the output of the motor or actuator which serves as an element of the drive mechanism for the optical element holding member is determined to be capable of accommodating the maximum load of the biasing device for biasing the optical element holding member. Namely, the greater the maximum load of the spring member, the stronger the drive source for the optical element holding member is required, which is disadvantageous with regard to the power consumption, the production cost and miniaturization of the apparatus containing the drive source. However, in the conventional installation structure of the extension or compression spring for an optical element holding member, the spring load, which is varied according to the amount of spring extension, tends to have a large variation range, and accordingly, it is difficult to minimize the maximum spring load.

In the extension or compression spring, it is possible to achieve a reduction in load variation of the spring for a certain amount of movement of the optical element holding member by adopting an extension or compression spring having a longer length. However, in optical devices produced in recent years which are in strong demand to be miniaturized, increasing the length of the spring runs counter to space saving and thus cannot be easily adopted. In particular, in zoom lens barrels, the desire to make them compact in the lens barrel accommodated state in which no picture taking is performed has been great, and a retractable lens barrel structure in which the distances between a plurality of optical elements in the optical axis direction are minimized as much as possible to achieve a reduction of the length of the lens barrel when the lens barrel is accommodated is often adopted. Therefore, the length of the optical element holding member in the moving direction thereof is subjected to constraints of the length of the retracted lens barrel, so that it has been difficult to adopt a long spring as the biasing device for biasing the optical element holding member. As a result, the aforementioned problem of the spring load having a large variation range easily occurs.

Additionally, although the variation range of the spring load can be reduced by reducing the amount of movement of the optical element holding member, the amount of movement of the optical element holding member (namely, the amount of movement of the optical element held by the optical element holding member) is originally determined to satisfy a required optical performance, and this optical performance may not be obtained if the amount of movement of the optical element holding member is limited. For instance, in the zoom lens barrel which is constructed so as to be as small as possible in the optical axis direction when the zoom lens barrel comes into the lens barrel accommodated state as mentioned above and which is designed as a high powered lens, the amount of movement of the optical element holding member tends to be great.

SUMMARY OF THE INVENTION

The present invention provides an optical element position control mechanism in which the load variation of the spring for biasing the optical element holding member that is caused by movement of the optical element holding member is small even though the mechanism can be structured in a space-saving manner, and in which both miniaturization and low power consumption are achieved at a high level.

In addition, the present invention provides an optical element position control mechanism which includes such a biasing device which has reduced load variation, wherein the biasing device is securely protected from damage which may be caused by external or internal contact of other elements or an assembly worker's hand with the biasing device.

According to an aspect of the present invention, an optical element position control mechanism is provided, including an optical element holding member which holds an optical element of a photographing system and is guided in an optical axis direction; a drive mechanism for moving the optical element holding member in the optical axis direction; and a biasing device including an arm which is swingable about a swing axis, the swing axis being substantially orthogonal to the optical axis, and the arm extending substantially orthogonal to the swing axis and having a free end portion which engages with the optical element holding member to bias the optical element holding member in the optical axis direction.

It is desirable for the biasing device to include a torsion spring including a coiled portion supported by a support member provided separately from the optical element holding member, a central axis of the coiled portion being substantially coincident with the swing axis; a first arm portion which constitutes the arm and extends radially outwards from the coiled portion to be engaged with the optical element holding member at the free end portion thereof; and a second arm portion which extends radially outward from the coiled portion to be engaged with the support member. The torsion spring varies an amount of resilient deformation thereof in a direction of rotation of the torsion spring about the central axis of the coiled portion in accordance with movement of the optical element holding member.

It is desirable for an amount of angular displacement of the first arm portion in a rotation direction thereof from a free state of the first arm portion at which the first arm portion is disengaged from the optical element holding member until when the first arm portion comes into a force-applied state at which the first arm portion is engaged with the optical element holding member to be greater than an amount of angular displacement of the first arm portion in the rotation direction thereof between a forward movement limit and a rearward movement limit of the optical element holding member in the force-applied state.

It is desirable for the arm of the biasing device to include a lever pivoted at one end thereof on a support member, which is provided separately from the optical element holding member, the other end of the lever being engaged with the optical element holding member, and for the biasing device to include a lever biasing member for biasing the lever in one of forward and reverse rotational directions about the swing axis.

It is desirable for the lever biasing member includes a torsion spring including a coiled portion supported by the support member, a central axis of the coiled portion being substantially coincident with the swing axis; a first arm portion which extends radially from the coiled portion outwards to be engaged with the lever; and a second arm portion which extends radially outwards from the coiled portion to be engaged with a spring-hooked portion of the support member. The torsion spring varies an amount of resilient deformation thereof in a direction of rotation of the torsion spring about the central axis of the coiled portion in accordance with a swing movement of the lever.

It is desirable for the lever biasing member to include an extension spring, one end and the other end of which are engaged with the lever and the support member, respectively, a length of the extension spring varying in accordance with a swing movement of the lever.

It is desirable for a distance from the swing axis to an engaging portion of the lever which engages with the extension spring to be smaller than a distance from the swing axis to an engaging portion of the lever which engages with the optical element holding member.

It is desirable for the optical element position control mechanism to include a rotational ring which moves at least one optical element provided separately from the optical element by rotation of the rotational ring, and for the drive mechanism and the biasing device to be positioned radially outside the rotational ring. According to this configuration, the biasing device can be configured with no restrictions of a movable member such as a rotational ring.

It is desirable for the swing axis and the free end portion of the arm of the biasing device to be positioned outside the rotational ring in one and the other of two spaces provided on both sides of a plane, respectively, which is substantially parallel to the swing axis and lies on the optical axis. Accordingly, the load variation of the biasing device can be reduced in an effective manner, and also space utilization can be enhanced.

It is desirable for the drive mechanism to include a screw shaft which rotates on an axis thereof parallel to the optical axis; and a nut which is screw-engaged with the screw shaft and moves forward and rearward in the optical axis direction by forward and reverse rotations of the screw shaft. A position of the optical element holding member in the optical axis direction is determined by contact of the optical element holding member with the nut. The biasing device biases the optical element holding member in a direction to bring the optical element holding member into contact with the nut.

It is desirable for the drive mechanism to include a guide member including at least one guide surface inclined with respect to the optical axis direction; and a follower which projects from the optical element holding member to slide on the guide surface. The follower is pressed against the guide surface of the guide member by a biasing force of the biasing device.

It is desirable for the guide member to include a cam shaft extending in the optical axis direction, wherein a lead groove serving as a cam groove, in which the follower is slidably engaged, is formed on a peripheral surface of the cam shaft, and the guide surface is positioned inside the lead groove.

It is desirable for the optical element position control mechanism to include a stationary cylindrical portion positioned inside the biasing device and surrounding the photographing optical system; and a protective wall member provided as a separate element from the stationary cylindrical portion, and fixed to the stationary cylindrical portion to create an accommodation space between an outer peripheral surface of the stationary cylindrical portion and the protective wall member, the biasing device being accommodated in the accommodation space.

It is desirable for the protective wall member to be integral with an image pickup device holder which holds an image pickup device so that the image pickup device lies at an image forming position.

It is desirable for one of the stationary cylindrical member and the protective wall member to include a swing movement support projection which supports a swing center portion of the biasing device to allow a swing movement of the arm about the swing axis.

It is desirable for the protective wall member to include a side wall portion substantially parallel to a swing plane in which the arm of the biasing device swings about the swing axis.

It is desirable for the stationary cylindrical member to include a rotational-ring guide mechanism, provided on an inner peripheral surface of the stationary cylindrical member almost over an entire circumferential range of the stationary cylindrical member, for rotationally guiding a rotational ring, positioned inside the stationary cylindrical member, to control a position of the rotational ring in the optical axis direction. The rotational ring moves at least one optical element provided separately from the optical element by rotation of the rotational ring.

It is desirable for the optical element holding member to be guided linearly without rotating about the optical axis.

It is desirable for the drive mechanism to include a motor and a reduction gear train.

According to the present invention, an optical element position control mechanism is achieved in which load variation of the spring for biasing the optical element holding member that is caused by movement of the optical element holding member is small even though the mechanism can be structured in a space-saving manner, and in which both miniaturization and low power consumption are achieved at a high level.

In addition, the biasing device can be securely protected independently of the shape of the stationary cylindrical member because the biasing device that biases the optical element holding member by swinging about an axis substantially orthogonal to a plane parallel to the optical axis is installed between the stationary cylindrical member and the protective wall member that is provided as a separate member from the stationary cylindrical member.

The present disclosure relates to subject matter contained in Japanese Patent Applications No. 2007-291656 (filed on Nov. 9, 2007) and No. 2008-174689 (filed on Jul. 3, 2008) which are expressly incorporated herein by reference in their entireties.

BRIEF DESCRIPTION OF THE DRAWINGS

The present invention will be described below in detail with reference to the accompanying drawings in which:

FIGS. 15A and 15B are graphs for comparison between spring load variations in the embodiment shown in FIG. 13 and spring load variations in the comparative example shown in FIG. 14, wherein FIG. 15A shows the spring load variations in the embodiment shown in FIG. 13 and FIG. 15B shows the spring load variations in the comparative example shown in FIG. 14;

FIG. 25 is a developed plan view of another embodiment of the cylindrical portion of the housing and the cam ring that are different in structure from those shown in FIG. 24.

DESCRIPTION OF THE PREFERRED EMBODIMENTS

Figure 1:
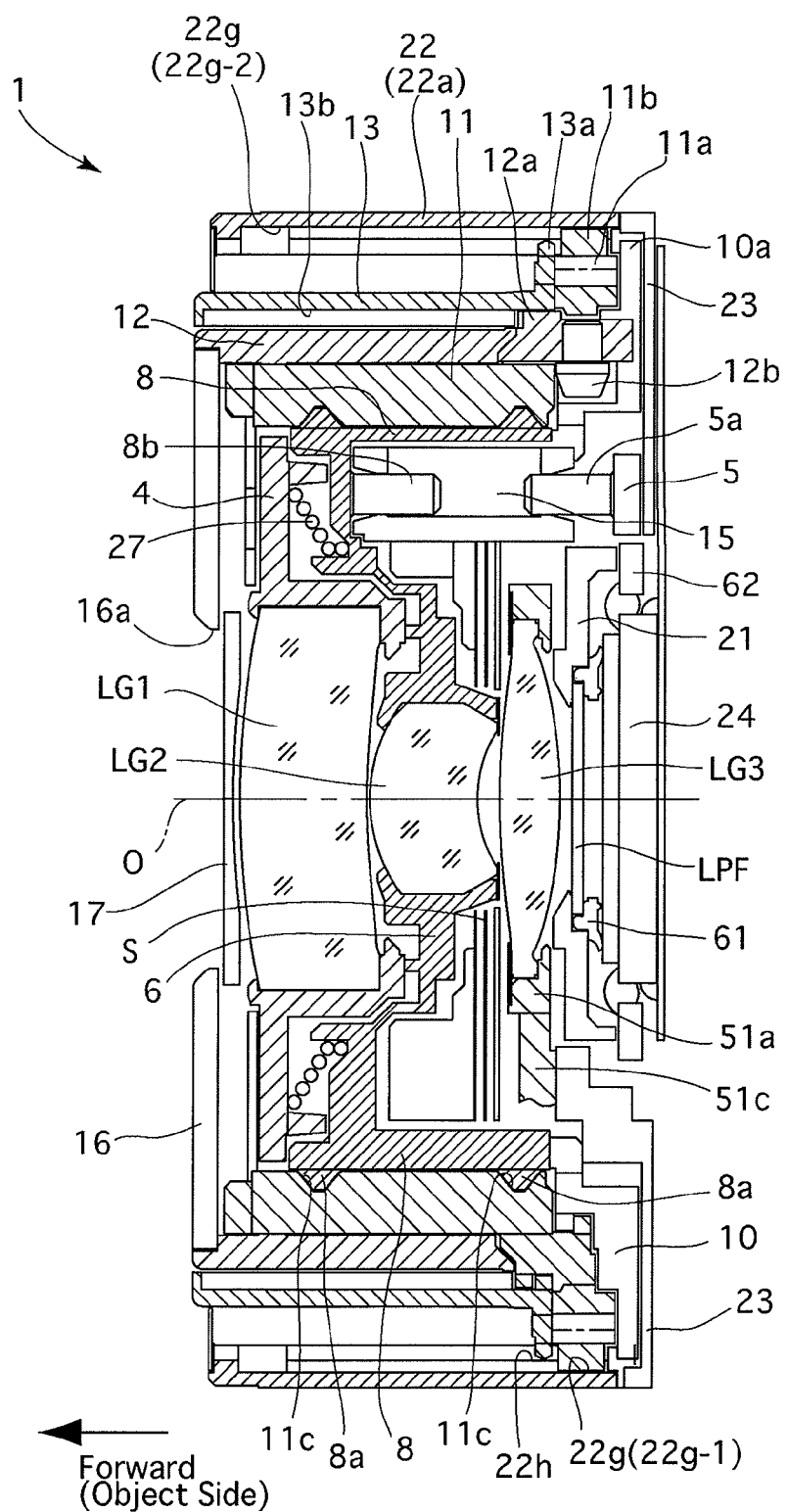
FIG. 1 is a cross sectional view of a zoom lens barrel to which a mechanism for controlling the position of an optical element according to the present invention is applied, showing the zoom lens barrel in a lens barrel accommodated state (fully retracted state)
Figure 2:
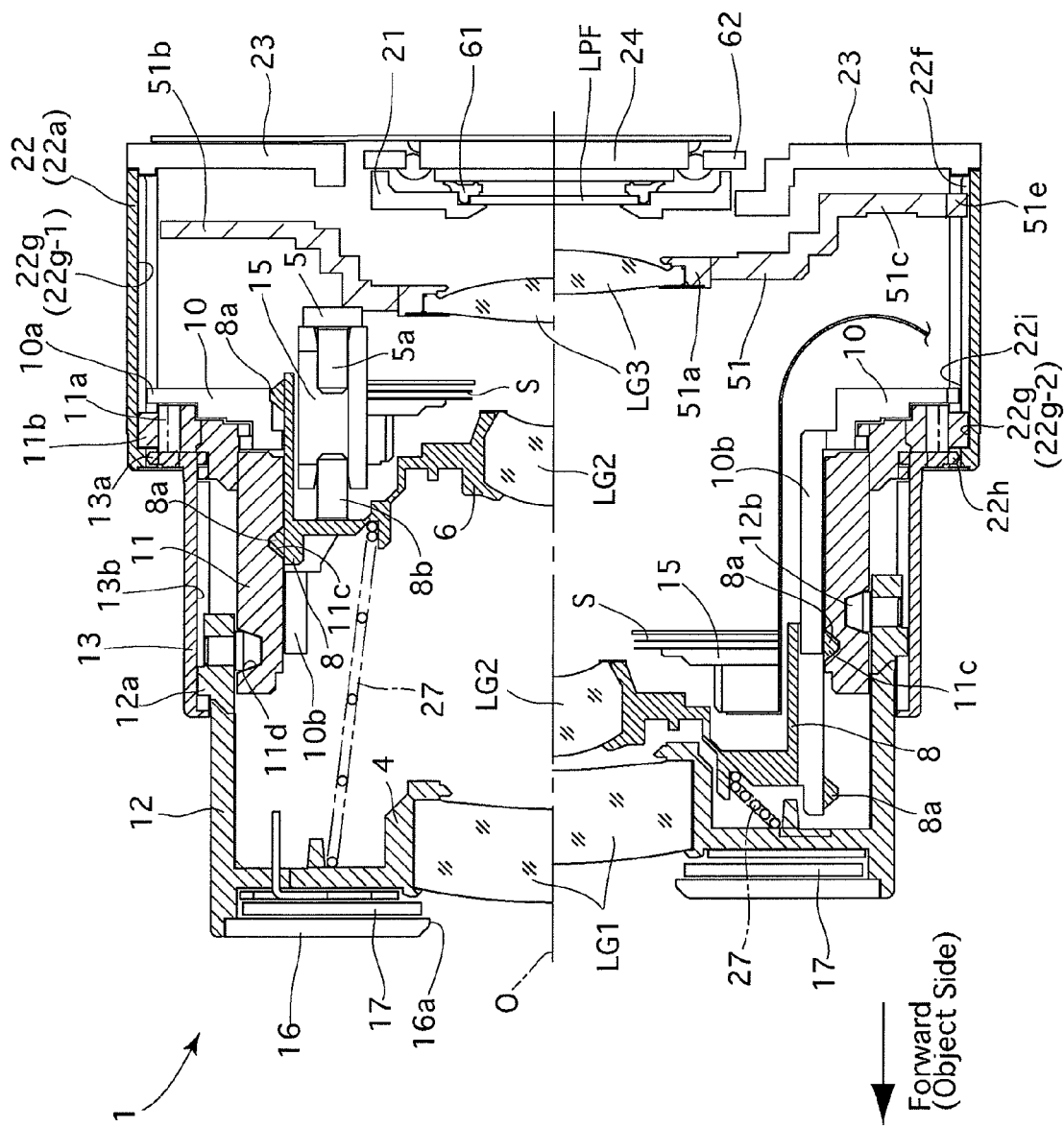
FIG. 2 is a cross sectional view of the zoom lens barrel in a ready-to-photograph state, wherein an upper half and a lower half of the zoom lens barrel shown in FIG. 2 show the zoom lens barrel set at the wide-angle extremity and the telephoto extremity, respectively.
Figure 3:
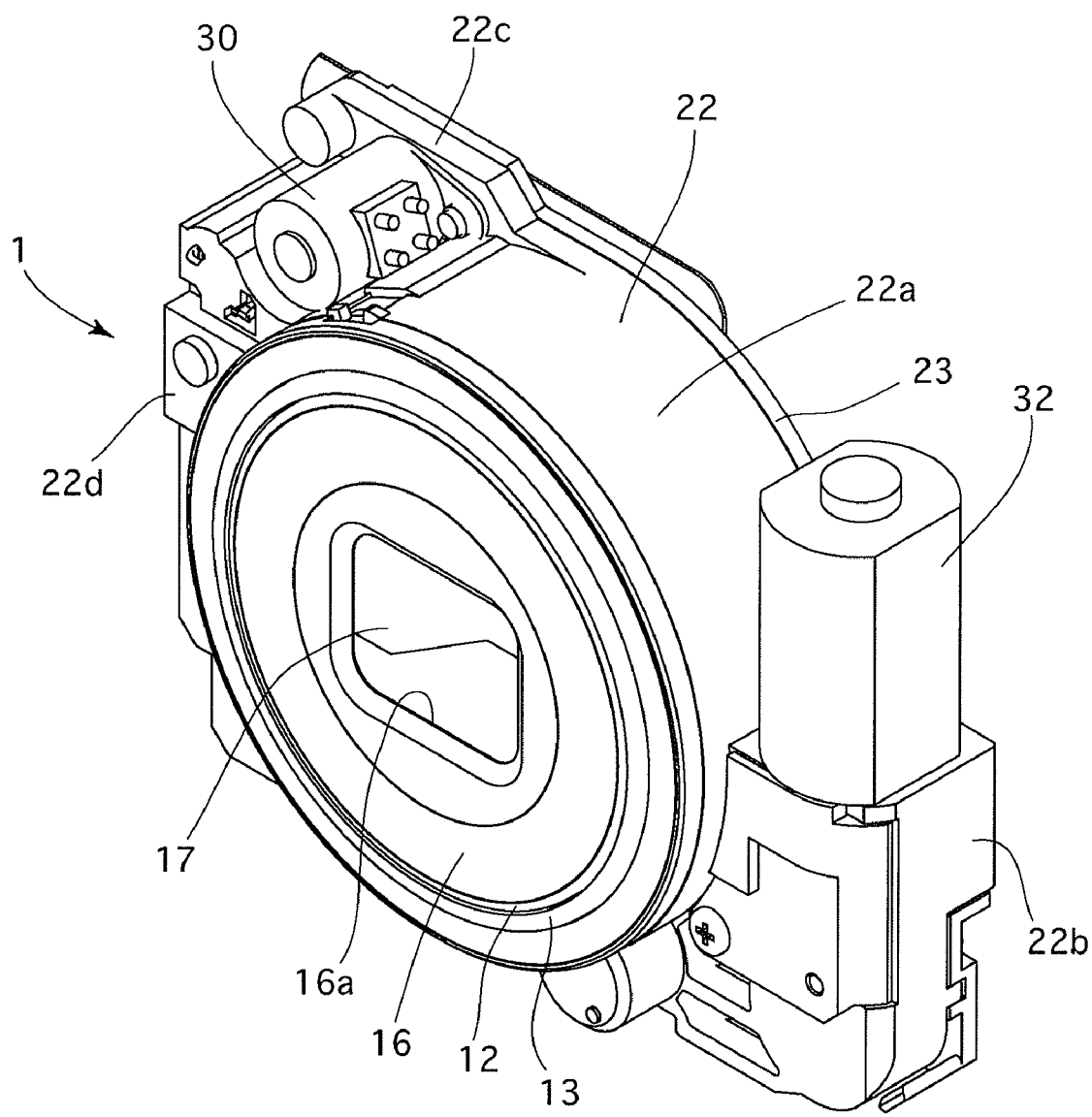
FIG. 3 is a front perspective view of the zoom lens barrel in the lens barrel accommodated state.
Figure 4:
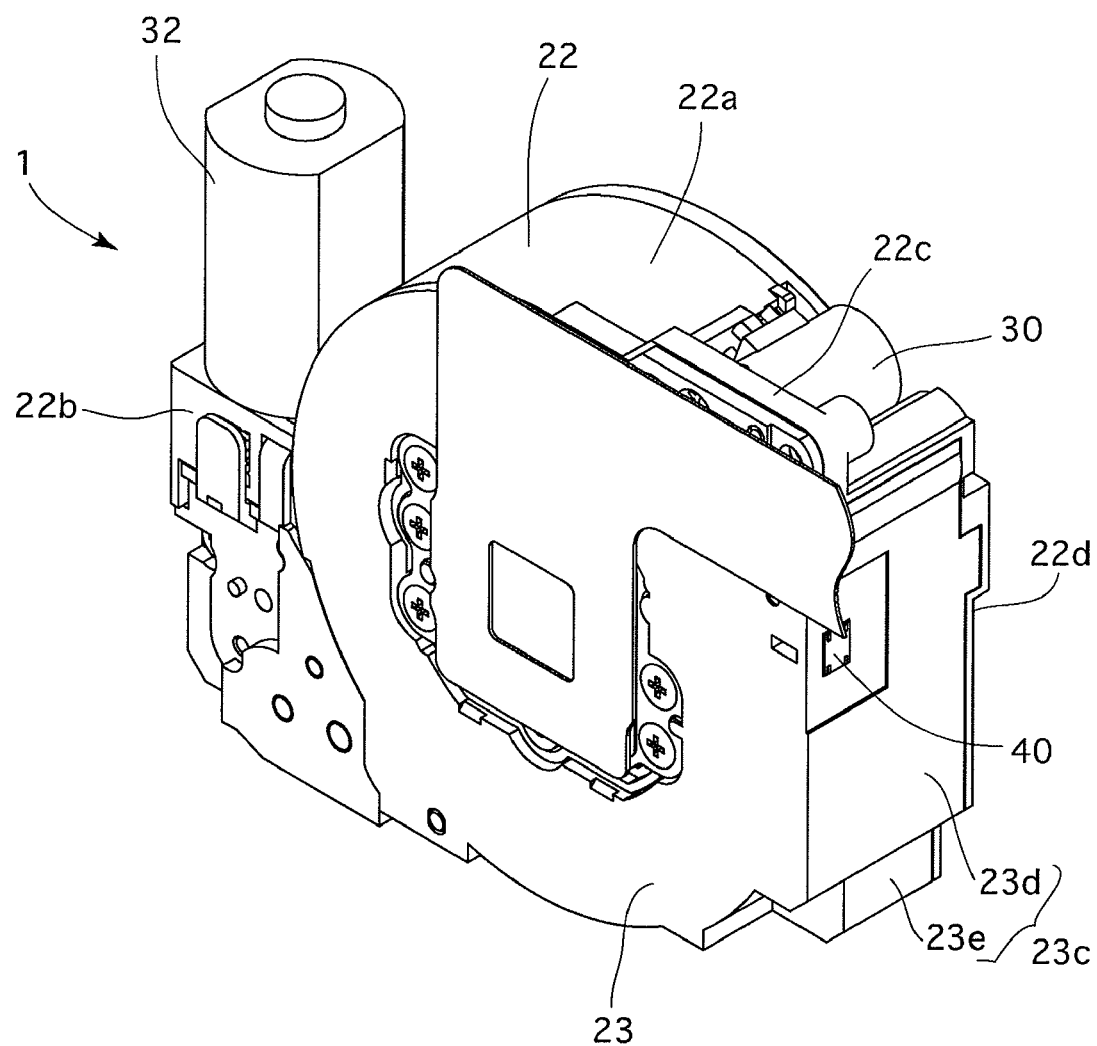
FIG. 4 is a rear perspective view of the zoom lens barrel in the lens barrel accommodated state.
Figure 5:
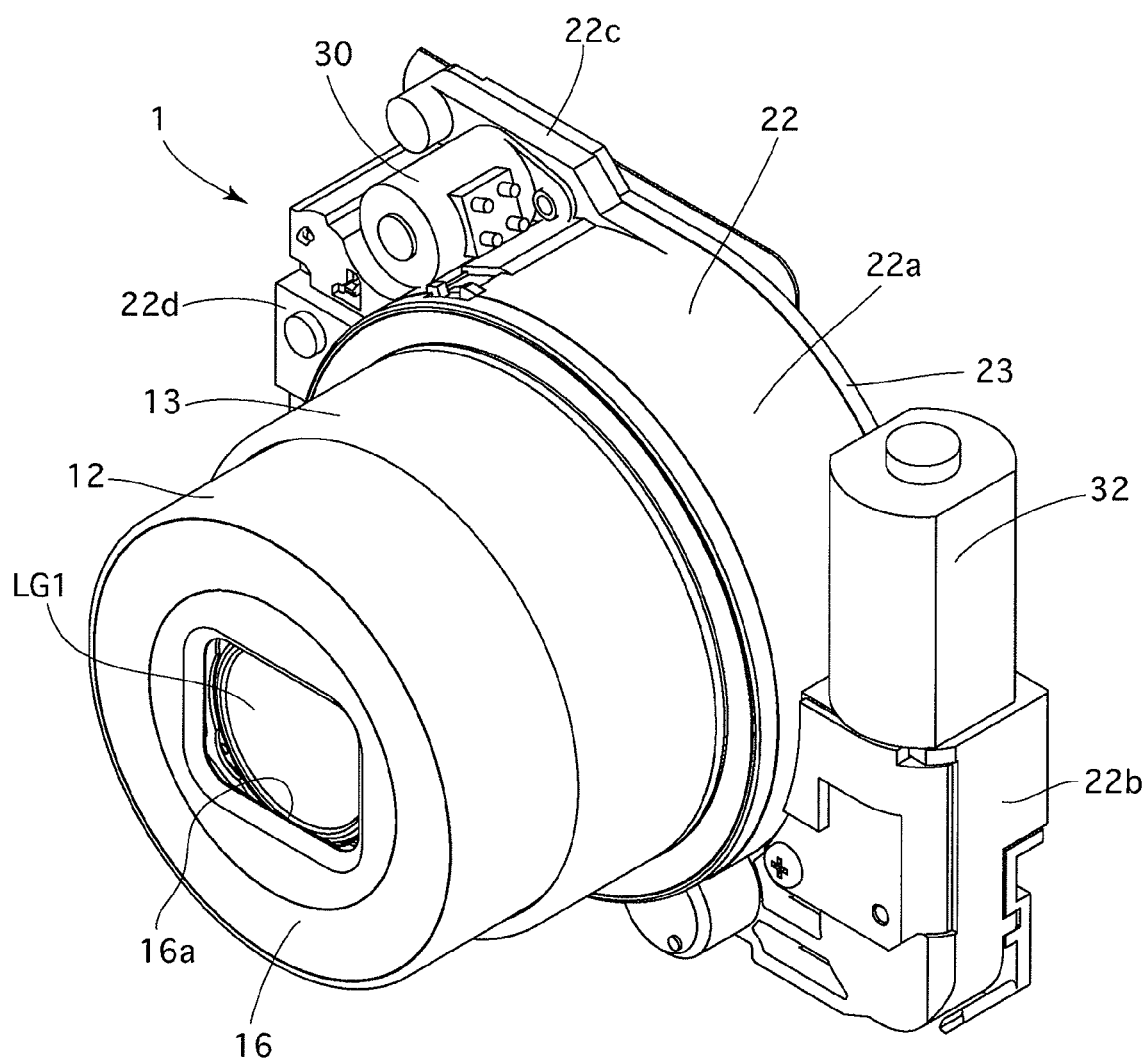
FIG. 5 is a front perspective view of the zoom lens barrel is in a ready-to-photograph state.
Figure 6:
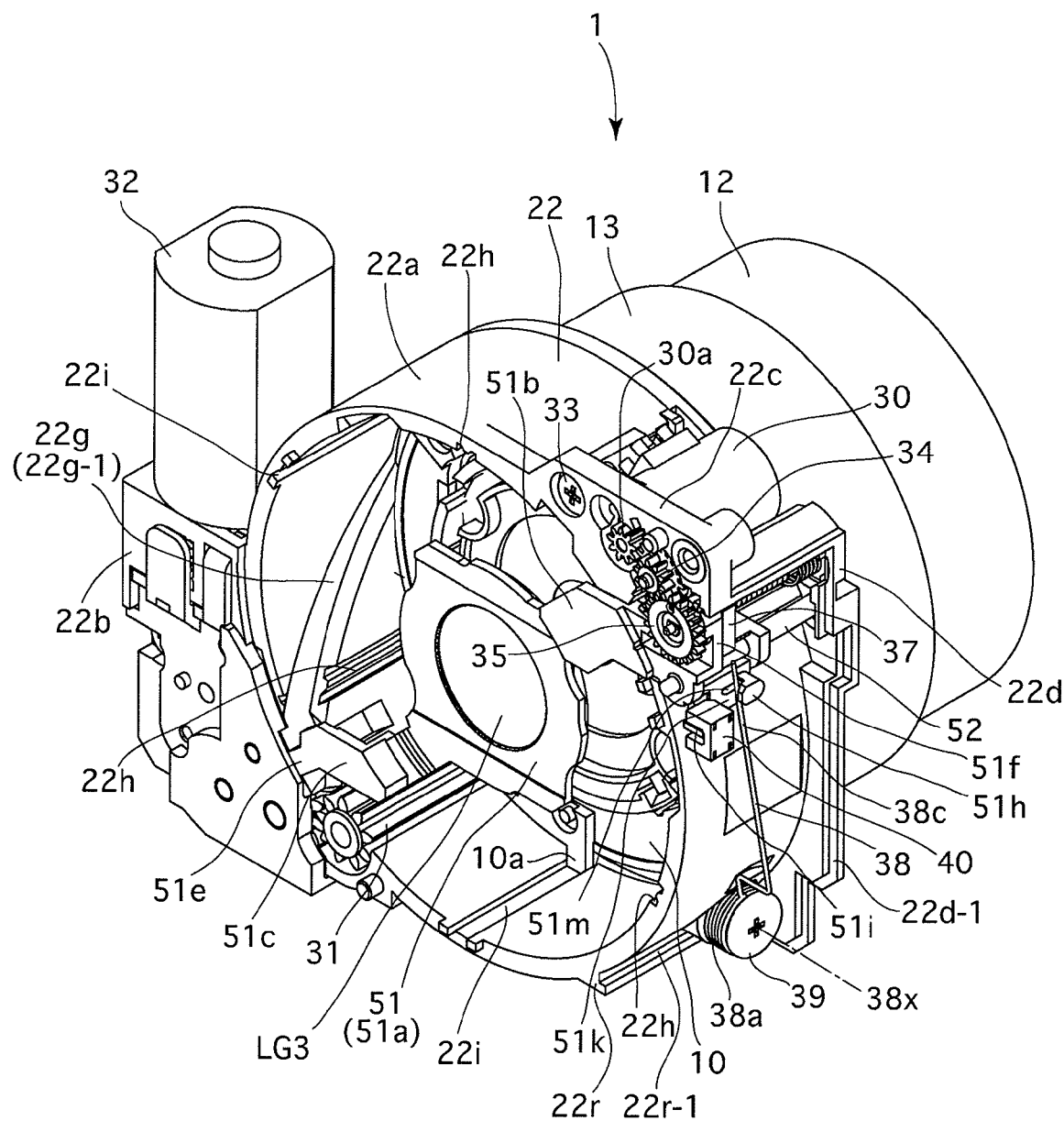
FIG. 6 is a rear perspective view of the zoom lens barrel in a ready-to-photograph state with the image-pickup device holder of the zoom lens barrel being removed.

Firstly, the overall structure of a zoom lens barrel 1 to which an optical element position control mechanism according to the present invention is applied will be hereinafter discussed with reference mainly to FIGS. 1 through 7. FIGS. 1 and 2 each show a cross sectional view of the zoom lens barrel 1, FIG. 1 shows a state where the zoom lens barrel 1 is in a lens barrel accommodated state, in which no pictures are taken, an upper half of the cross sectional view in FIG. 2 shows the zoom lens barrel 1 set at the wide-angle extremity, and a lower half of the cross sectional view in FIG. 2 shows the zoom lens barrel 1 set at the telephoto extremity. FIGS. 3 and 4 are perspective views of the zoom lens barrel 1 in the lens barrel accommodated state, and FIGS. 5 and 6 are perspective views of the zoom lens barrel 1 in a ready-to-photograph state.

The zoom lens barrel 1 is provided with a photographing optical system which includes a first lens group LG1, a second lens group LG2, a set of shutter blades (mechanical shutter) S that also serves as a diaphragm, a third lens group LG3, a low-pass filter (optical filter) LPF and an image-pickup device (image sensor) 24 such as CCD or CMOS, in that order from the object side. This photographing optical system is configured as a zoom optical system. A focal-length varying operation (zooming operation) is performed by moving the first lens group LG1 and the second lens group LG2 along an optical axis O of the photographing optical system in a predetermined moving manner, and a focusing operation is carried out by moving the third lens group LG3 along the optical axis O. In the following descriptions, the expression "optical axis direction" includes the direction parallel to the optical axis O of the photographing optical system.

The zoom lens barrel 1 is provided with a housing (support member) 22 which supports the optical system from the first lens group LG1 to the third lens group LG3 inside the housing 22 to allow these lens groups to move in the optical axis direction. The zoom lens barrel 1 is provided with an image-pickup device holder (image-pickup device holding member) 23 which is fixed to the back of the housing 22. An opening is formed in a central portion of the image-pickup device holder 23, and the image-pickup device 24 is held in the opening via an image-pickup device frame 62. A filter frame 21 which is fixed to the front of the image-pickup device frame 62 holds the low-pass filter LPF. A packing (sealing member) 61 for dust prevention is tightly held between the low-pass filter LPF and the image-pickup device 24. The image-pickup device frame 62 is supported by the image-pickup device holder 23 to make a tilt adjustment of the image-pickup device frame 62 relative to the image-pickup device holder 23 possible.

The housing 22 is provided around a cylindrical portion (stationary cylindrical portion) 22a thereof with a zoom motor support portion 22b, an AF mechanism mounting portion 22c and a front wall portion 22d. The cylindrical portion 22a surrounds the optical axis O, the zoom motor support portion 22b supports a zoom motor 32, the AF mechanism mounting portion 22c supports an AF motor (an element of a drive mechanism) 30, and the front wall portion 22d is positioned in front of the AF mechanism mounting portion 22c. The cylindrical portion 22a supports the aforementioned optical elements such as each lens group inside the cylindrical portion 22a and forms a substantial outer-shape of the zoom lens barrel 1. The zoom motor support portion 22b, the AF mechanism mounting portion 22c and the front wall portion 22d are positioned radially outside the cylindrical portion 22a about the optical axis O. As shown in FIGS. 3 through 7, the AF mechanism mounting portion 22c is formed in the vicinity of the rear end portion of the cylindrical portion 22a, and the rear surface portion of the AF mechanism mounting portion 22c is closed by the image-pickup device holder 23. The front wall portion 22d is formed on the housing 22 at a position forwardly away from the AF mechanism mounting portion 22c in the optical axis direction to face the AF mechanism mounting portion 22c.

Figure 11:
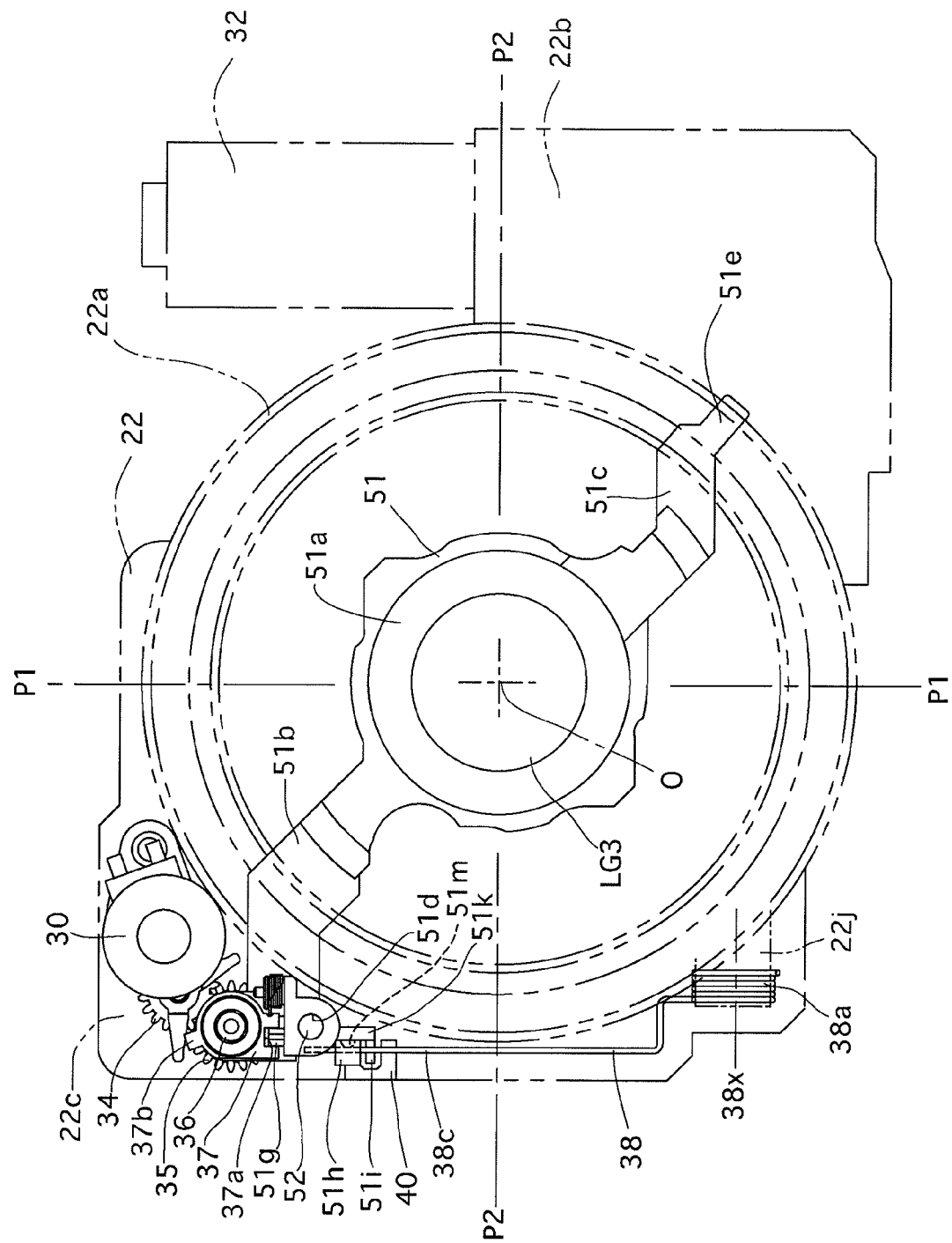
FIG. 11 is a front elevational view of the zoom lens barrel, mainly showing the third lens group frame and the position control mechanism therefor.
Figure 12:
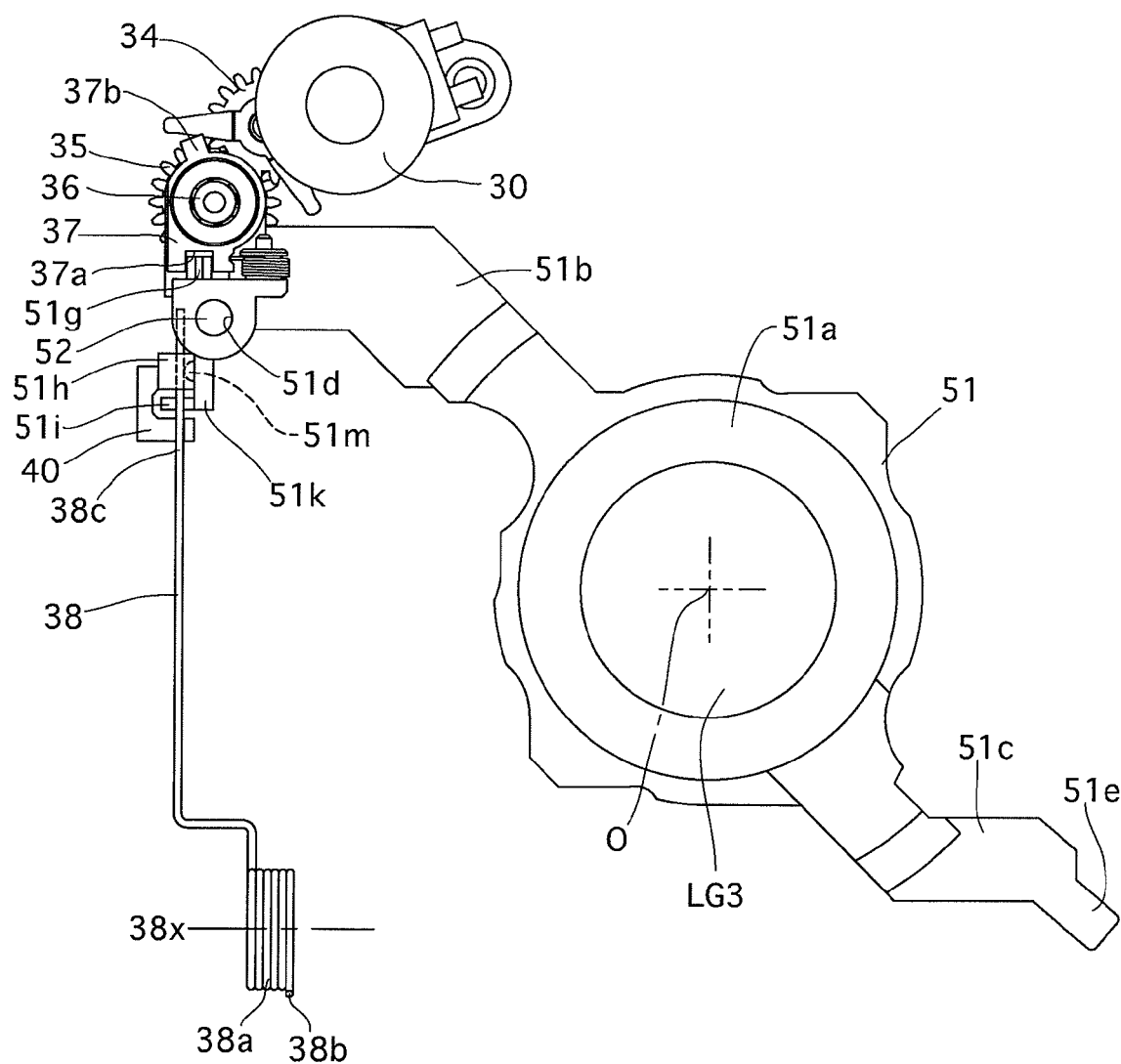
FIG. 12 is a front elevational view of the third lens group frame and the position control mechanism therefor that are shown in FIG. 11.
Figure 23:
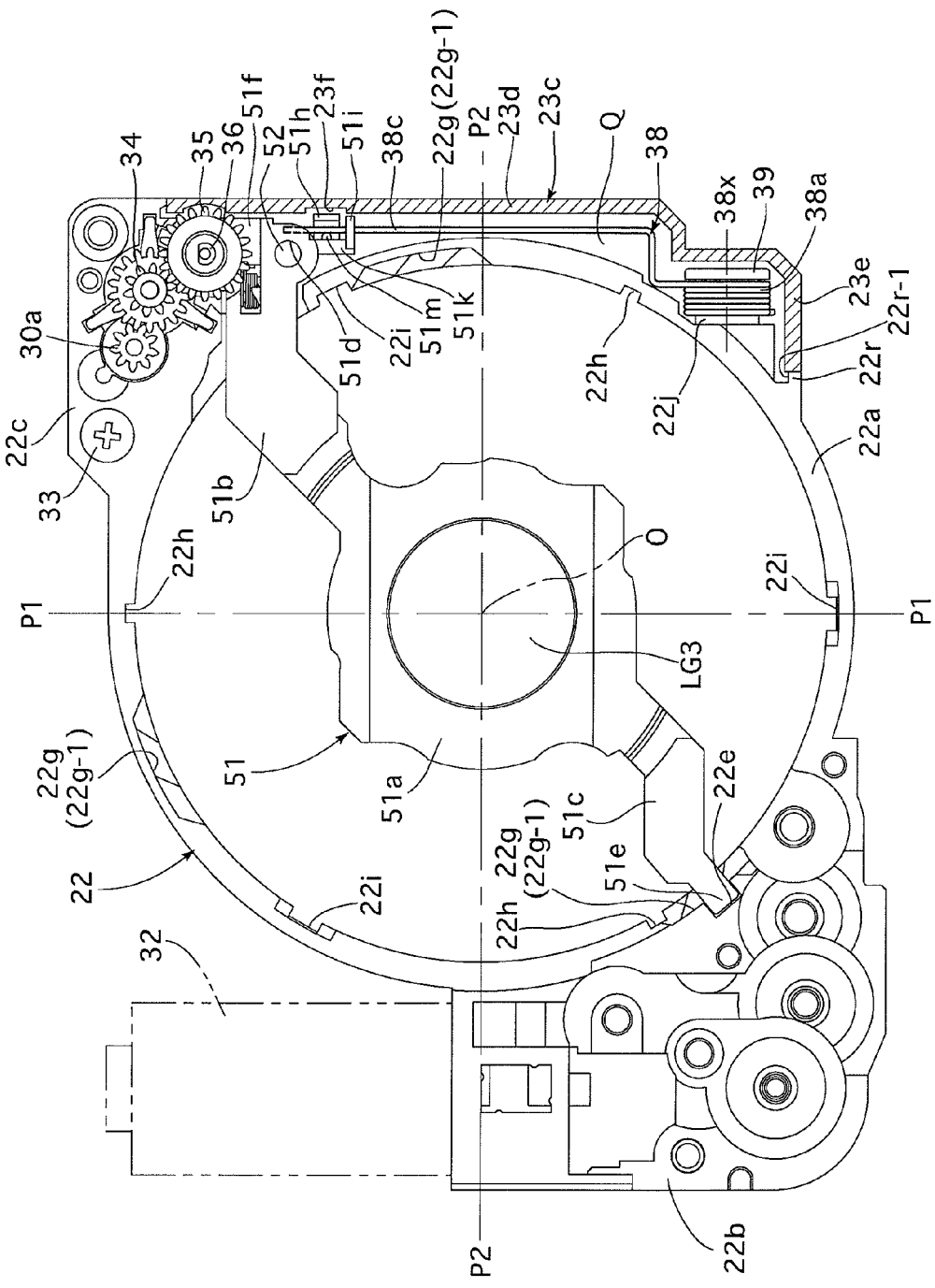
FIG. 23 is a rear elevational view of main parts of the first embodiment of the optical element position control mechanism, showing an embodiment of a protective structure which protects the torsion spring for biasing the third lens group frame.

The zoom lens barrel 1 is provided with a third lens group frame (optical element holding member) 51 which holds the third lens group LG3. The third lens group frame 51 is provided with a pair of guide arm portions 51b and 51c which are formed to extend from a central lens holding portion 51a of the third lens group frame 51 in substantially opposite radial directions symmetrical with respect to the optical axis O. The guide arm portion 51b is provided in the vicinity of the radially outer end thereof with a pair of guide holes (front and rear guide holes which align in the optical axis direction) 51d into which a third lens group guide shaft (advancing/retracting movement guide member) 52 is inserted to be freely slidable relative to the pair of guide holes 51d. The third lens group guide shaft 52 is fixed at the front and rear ends thereof to the housing 22 and the image-pickup device holder 23, respectively. As shown in FIGS. 6, 11 and 23, the third lens group guide shaft 52 is positioned outside the cylindrical portion 22a of the housing 22, and the front end portion of the third lens group guide shaft 52 is supported by the front wall portion 22d. The rear end portion of the third lens group guide shaft 52 passes below the AF mechanism mounting portion 22c and is engaged in a shaft support hole 23a (see FIG. 8) formed in the image-pickup device holder 23. In order to be guided by the third lens group guide shaft 52, the guide arm portion 51b of third lens group frame 51 is formed so that a portion of the guide arm portion 51b in the vicinity of the radially outer end thereof projects outwardly from the cylindrical portion 22a of the housing 22, and the cylindrical portion 22a is provided with an opening 22e (see FIG. 7) which allows the guide arm portion 51b from projecting outwardly from the cylindrical portion 22a. The third lens group frame 51 is provided at the radially outer end of the other guide arm portion 51c with an anti-rotation projection 51e, and the housing 22 is provided on an inner peripheral surface thereof with a linear guide groove 22f elongated in the optical axis direction in which the anti-rotation projection 51e is engaged to be freely slidable. This engagement between the anti-rotation projection 51e and the linear guide groove 22f prevents the third lens group frame 51 from rotating. Accordingly, the third lens group frame 51 is guided in a manner to be capable of moving only linearly in the optical axis direction along the third lens group guide shaft 52, and the third lens group frame 51 can be moved forward and rearward in the optical axis direction by the AF motor 30. The drive mechanism for the third lens group frame 51 will be discussed later.

Figure 7:
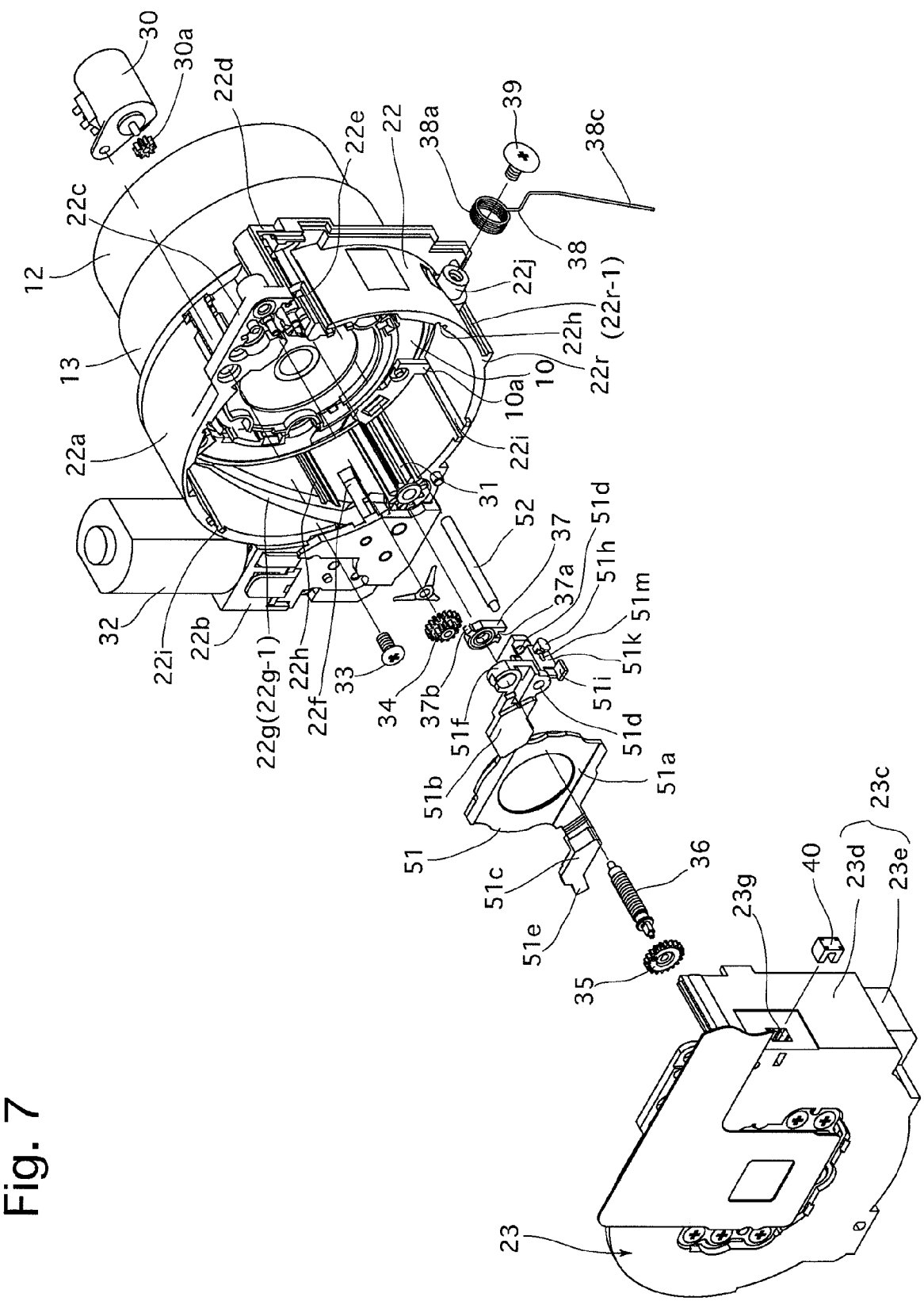
FIG. 7 is an exploded rear perspective view of the zoom lens barrel with elements thereof which are associated with position control for the third lens group removed.
Figure 24:
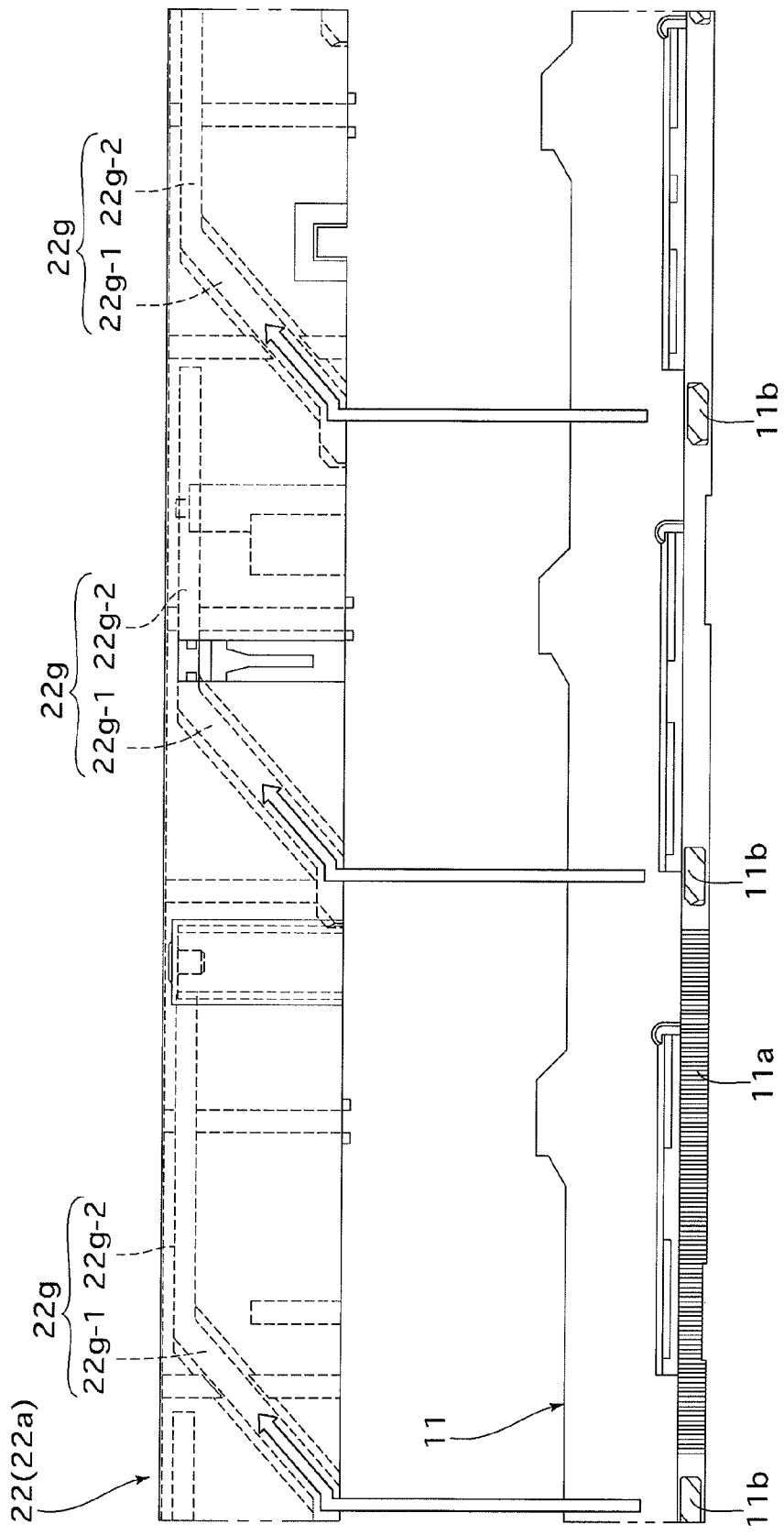
FIG. 24 is a developed plan view of the cylindrical portion of the housing and the cam ring in the first embodiment of the optical element position control mechanism.

The zoom lens barrel 1 is provided inside the zoom motor support portion 22b of the housing 22 with a reduction gear train which transfers the driving force of the zoom motor 32 to a zoom gear 31 (see FIGS. 6 and 7). As shown in FIG. 24, the zoom lens barrel 1 is provided inside the cylindrical portion 22a with a cam ring (rotational ring) 11 that is supported inside the cylindrical portion 22a, and the cam ring 11 is provided at the rear end thereof with an annular gear 11a which is in mesh with the zoom gear 31. The cam ring 11 is driven to rotate by the zoom motor 32 via the engagement of the annular gear 11a with the zoom gear 31. The cam ring 11 is provided on the annular gear 11a with a set of three guide projections 11b, and the housing 22 is provided on an inner peripheral surface of the cylindrical portion 22a with a set of three cam ring control grooves (elements of a rotational-ring guide mechanism) 22g (see FIG. 24) in which the set of three guide projections 11b are slidably engaged, respectively. Each cam ring control groove 22g is composed of a lead groove portion 22g-1, and a circumferential groove portion 22g-2 positioned in front of the lead groove portion 22g-1, wherein the lead groove portion 22g-1 is inclined with respect to the direction of the optical axis O and the circumferential groove portion 22g-2 is made solely of a circumferential component about the optical axis O. When the zoom lens barrel 1 is in between the accommodated (fully retracted) state shown in FIG. 1 and the wide-angle extremity state shown by an upper half of FIG. 2, by applying torque onto the cam ring 11 via the zoom motor 32 causes the cam ring 11 to move in the optical axis direction while rotating with the guide projections 11b being respectively guided by the aforementioned lead groove portions 22g-1 of the cam ring control grooves 22g. More specifically, the cam ring 11 advances (toward the object side) in the optical axis direction while rotating when the zoom lens barrel 1 moves into the wide-angle extremity state (ready-to-photograph state) from the lens barrel accommodated state. Conversely, when the zoom lens barrel 1 moves into the lens barrel accommodated state from the wide-angle extremity state (ready-to-photograph state), the cam ring 11 retracts in the optical axis direction while rotating. On the other hand, when the zoom lens barrel 1 is in a ready-to-photograph state (in the zoom range) between the wide-angle extremity state and the telephoto extremity state, the guide projections 11b of the cam ring 11 are positioned in the aforementioned circumferential groove portions 22g-2 of the cam ring control grooves 22g so that the cam ring 11 rotates at a fixed position in the optical axis direction, i.e., without moving in the optical axis direction.

The zoom lens barrel 1 is provided inside the cylindrical portion 22a of the housing 22 with a first advancing barrel 13 and a linear guide ring 10 which are supported inside the cylindrical portion 22a with the cam ring 11 being positioned between the first advancing barrel 13 and the linear guide ring 10. The first advancing barrel 13 is guided linearly in the optical axis direction by the engagement of linear guide projections 13a which project radially outwards from the first advancing barrel 13 with linear guide grooves 22h which are formed on an inner peripheral surface of the cylindrical portion 22a, respectively, and the linear guide ring 10 is guided linearly in the optical axis direction by the engagement of linear guide projections 10a which project radially outwards from the linear guide ring 10 with linear guide grooves 22i which are formed on an inner peripheral surface of the cylindrical portion 22a, respectively. Each of the first advancing barrel 13 and the linear guide ring 10 is coupled to the cam ring 11 to be rotatable relative to the cam ring 11 and to move with the cam ring 11 in the optical axis direction.

The linear guide ring 10 guides a second lens group moving frame 8 linearly in the optical axis direction by linear guide keys 10b (see FIG. 2) of the linear guide ring 10 which are positioned inside the cam ring 11. The zoom lens barrel 1 is provided inside the second lens group moving frame 8 with a second lens holding frame 6 which holds the second lens group LG2. The second lens holding frame 6 is integral with the second lens group moving frame 8. In addition, the first advancing barrel 13 is provided on an inner peripheral surface thereof with linear guide grooves 13b extending parallel to the optical axis O, and the second advancing barrel 12 is provided with linear guide projections 12a which project radially outwards to be slidably engaged in the linear guide grooves 13b, so that the second advancing barrel 12 is also guided linearly in the optical axis direction. The zoom lens barrel 1 is provided inside the second advancing barrel 12 with a first lens group holding frame 4 which holds the first lens group LG1.

The cam ring 11 is provided on an inner peripheral surface thereof with second-lens-group control cams 11c, and the second lens group moving frame 8 is provided on an outer peripheral surface thereof with cam followers 8a, for moving the second lens group LG2, which are slidably engaged in the second-lens-group control cams 11c, respectively. Since the second lens group moving frame 8 is guided linearly in the optical axis direction via the linear guide ring 10, a rotation of the cam ring 11 causes the second lens group moving frame 8 (the second lens group LG2) to move in the optical axis direction in a predetermined moving manner in accordance with the contours of the second-lens-group control cam grooves 11c.

The second advancing barrel 12 is provided with cam followers 12b, for moving the first lens group LG1, which project radially inwards, and the cam ring 11 is provided on an outer peripheral surface thereof with first-lens-group control cam grooves 11d in which the cam followers 12b are slidably engaged, respectively. Since the second advancing barrel 12 is guided linearly in the optical axis direction via the first advancing barrel 13, a rotation of the cam ring 11 causes the second advancing barrel 12 (the first lens group LG1) to move in the optical axis direction in a predetermined moving manner in accordance with the contours of the first-lens-group control cam grooves 11d.

The second lens group moving frame 8 and the second advancing barrel 12 are biased in opposite directions away from each other by an inter-lens-group biasing spring 27 to improve the degree of precision of the engagement between each cam follower 8a and the associated second-lens-control cam groove 11c and the degree of precision of the engagement between each cam follower 12b and the associated first-lens-group control cam groove 11d.

The zoom lens barrel 1 is provided inside the second lens group moving frame 8 with a shutter unit 15 including the shutter blades S which is supported by the second lens group moving frame 8. The zoom lens barrel 1 is provided behind the second lens group moving frame 8 with a rear-mounted limit member 5, and the second lens group moving frame 8 and the rear-mounted limit member 5 are provided with a guide projection 8b and a guide projection 5a as a pair of projections which project in directions toward each other along a direction parallel to the optical axis O. The shutter unit 15 is supported by the two guide projections 8b and 5a to be slidable thereon in the optical axis direction.

A decorative plate 16 having a photographing aperture 16a is fixed to the front end of the second advancing barrel 12, and the zoom lens barrel 1 is provided immediately behind the decorative plate 16 with a set of protective barrier blades 17 which opens and shuts the photographing aperture 16a that is positioned in front of the first lens group LG1.

Operations of the zoom lens barrel 1 that has the above described structure will be discussed hereinafter. In the lens barrel accommodated state shown in FIGS. 1, 3 and 4, the length of the optical system in the optical axis direction (the distance from the front surface (object-side surface) of the first lens group LG1 to the imaging surface of the image-pickup device 24) is shorter than that in a ready-to-photograph state shown in FIGS. 2, 5 and 6. In the lens barrel accommodated state, upon a state transitional signal for transition from the lens barrel accommodated state to a ready-to-photograph state (e.g., turning ON a main switch of the camera to which the zoom lens barrel 1 is mounted) is turned ON, the zoom motor 32 is driven in the lens barrel advancing direction. This causes the zoom gear 31 to rotate, thus causing the cam ring 11 to move forward in the optical axis direction while rotating with the guide projections 11b being guided by the lead groove portions 22g-1 of the cam ring control grooves 22g, respectively. The linear guide ring 10 and the first advancing barrel 13 linearly move forward with the cam ring 11. This rotation of the cam ring 11 causes the second lens group moving frame 8 to move in the optical axis direction in a predetermined moving manner due to the engagements between the cam followers 8a and the second-lens-group control cam grooves 11c. In addition, the rotation of the cam ring 11 causes the second advancing barrel 12, which is guided linearly in the optical axis direction via the first advancing barrel 13, to move in the optical axis direction in a predetermined moving manner due to the engagements between the cam followers 12b and the first-lens-group control cam grooves 11d.

Namely, the amount of advancement of the first lens group LG1 from the lens barrel accommodated state is determined by the sum of the amount of forward movement of the cam ring 11 relative to the housing 22 and the amount of advancement of the second advancing barrel 12 relative to the cam ring 11, and the amount of advancement of the second lens group LG2 from the lens barrel accommodated state is determined by the sum of the amount of forward movement of the cam ring 11 relative to the housing 22 and the amount of advancement of the second lens group moving frame 8 relative to the cam ring 11. A zooming operation is carried out by moving the first lens group LG1 and the second lens group LG2 on the optical axis O while changing the air distance between the first lens group LG1 and the second lens group LG2. Driving the zoom motor 32 in a barrel-advancing direction so as to advance the zoom lens barrel from the lens barrel accommodated state shown in FIG. 1 firstly causes the zoom lens barrel 1 to move to the wide-angle extremity shown in the upper half of the cross sectional view in FIG. 2, and further driving the zoom motor 32 in the same direction causes the zoom lens barrel 1 to move to the telephoto extremity shown in the lower half of the cross sectional view in FIG. 2. In the zooming range between the telephoto extremity and the wide-angle extremity, the cam ring 11 only performs the above described fixed-position rotating operation while the guide projections 11b are engaged in the circumferential groove portions 22g-2 of the cam ring control grooves 22g of the housing 22, respectively, thus not moving either forward or rearward in the optical axis direction. Upon the main switch being turned OFF, the zoom motor 32 is driven in the lens barrel retracting direction, which causes the zoom lens barrel 1 to perform a lens barrel retracting operation reverse to the above described lens barrel advancing operation, thus returning the zoom lens barrel 1 to the lens barrel accommodated state shown in FIG. 1.

The set of shutter blades S are positioned behind the second lens group LG2 when the zoom lens barrel 1 is in a ready-to-photograph state as shown in FIG. 2. When the zoom lens barrel 1 moves from a ready-to-photograph state to the lens barrel accommodated state that is shown in FIG. 1, the shutter unit 15 is moved forward relative to the second lens group moving frame 8, inside the second lens group moving frame 8, in the optical axis direction so that a part of the second lens group LG2 and the set of shutter blades S lie in a plane orthogonal to the optical axis O. In addition, the set of protective barrier blades 17 are closed when the zoom lens barrel 1 is in the lens barrel accommodated state. The set of protective barrier blades 17 are opened in accordance with the advancing operation of the zoom lens barrel 1, in which the zoom lens barrel 1 is extended into a ready-to-photograph state.

The third lens group frame 51 that supports the third lens group LG3 can be moved forward and rearward in the optical axis direction by the AF motor 30 independently of the above described driving operations of the first lens group LG1 and the second lens group LG2 that are performed by the zoom motor 32. In addition, when the zoom lens barrel 1 is in a ready-to-photograph state at any focal length from the wide-angle extremity to the telephoto extremity, the third lens group frame 51 that supports the third lens group LG3 is moved along the optical axis direction to perform a focusing operation by driving the AF motor 30 in accordance with object distance information obtained by a distance measuring device (not shown) provided in, e.g., the camera to which the zoom lens barrel 1 is mounted.

The details of the position control mechanism for controlling the position of the third lens group frame 51 will be discussed hereinafter. As described above, the AF mechanism mounting portion 22c is formed on the housing 22 so as to be positioned outside the cylindrical portion 22a, and the front wall portion 22d is formed on the housing 22 so as to be positioned in front of the AF mechanism mounting portion 22c to face thereto. The AF motor 30 is fixed to the front of the AF mechanism mounting portion 22c by a set screw 33 so that a pinion 30a fixed on the rotary shaft of the AF motor 30 projects rearward from the back surface of the AF mechanism mounting portion 22c (FIG. 6). An intermediate gear 34 which is engaged with the pinion 30a and a driven gear 35 which is engaged with the intermediate gear 34 are rotatably supported on a back surface of the AF mechanism mounting portion 22c. The driven gear 35 is fixed to the rear end of a lead screw (screw shaft/an element of the drive mechanism) 36. Rotation of the rotary shaft of the AF motor 30 is transferred to the lead screw 36, via the pinion 30a, the intermediate gear 34 and the driven gear 35 which constitute a reduction gear train of AF drive mechanism. The front and rear ends of the lead screw 36 are fitted in a front shaft hole and a rear shaft hole 23b (see FIG. 8) which are formed in the front wall portion 22d of the housing 22 and the image-pickup device holder 23 to be rotatably supported thereby, respectively, so that the lead screw 36 can freely rotate on an axis of rotation substantially parallel to the optical axis O.

The third lens group frame 51 is provided at the radially outer end of the guide arm portion 51b with a nut abutting portion 51f. A through hole into which the lead screw 36 is inserted is formed through the nut abutting portion 51f. An AF nut (an element of the drive mechanism) 37 which is screw-engaged with the lead screw 36 is installed in front of the nut abutting portion 51f. The AF nut 37 is prevented from rotating by the engagement of an anti-rotation recess 37a (see FIG. 7) of the AF nut 37 with an anti-rotation projection 51g (see FIGS. 8 and 9) of the third lens group frame 51 and the engagement of an anti-rotation projection 37b of the AF nut 37 with an anti-rotation recess (not shown) formed in the housing 22. Rotating the lead screw 36 forward and reverse causes the AF nut 37 to move forward and rearward in a direction parallel to the optical axis O without rotating with the lead screw 36. The third lens group frame 51 is provided, in the vicinity of the radially outer end of the guide arm portion 51b between the pair of guide holes 51d, with an upright wall portion 51k which is formed in a flat shape substantially parallel to the optical axis O. The third lens group frame 51 is provided on the upright wall portion 51k with a spring hook 51h which projects laterally from the upright wall portion 51k. The spring hook (projection) 51h is formed in an L-shaped projection which is bent so that the front end faces rearwardly in the optical axis direction. The third lens group frame 51 is provided, behind the spring hook 51h on a side of the upright wall portion 51k, with a semicircular-cross-sectional portion 51m.

The zoom lens barrel 1 is provided therein with a torsion spring 38 serving as a biasing device which gives the third lens group frame 51 a biasing force in a direction to move the third lens group frame 51 along the optical axis O. The torsion spring 38 has a coiled portion (swing center portion) 38a. The coiled portion 38a is supported by a spring support projection (swing movement support projection) 22j formed on the housing 22. The spring support projection 22j is shaped into a cylindrical projection and formed on an outer surface of the cylindrical portion 22a with the axis of the spring support projection 22j extending in a direction substantially orthogonal to a vertical plane P1 (see FIGS. 11 and 23) parallel to the optical axis O (the vertical plane P1 includes the optical axis O). The coiled portion 38a of the torsion spring 38 is held onto the cylindrical outer surface of the spring support projection 22j while being prevented from slipping off the spring support projection 22j by screwing a set screw 39 in a screw hole formed through the center of the spring support projection 22j. The central axis of the coiled portion 38a held to the spring support projection 22j is substantially coincident with the central axis of the spring support projection 22j.

The torsion spring 38 is provided with a short support arm portion (second arm portion) 38b and a long biasing arm portion (arm/first arm portion) 38c each of which projects radially outward from the coiled portion 38a. The short support arm portion 38b is hooked onto a spring hook (projection) 22k (see FIG. 13) which is formed on the housing 22 in the vicinity of the spring support projection 22j. On the other hand, the free end of the biasing arm portion 38c is hooked onto the spring hook 51h of the third lens group frame 51. The upright wall portion 51k and the semicircular-cross-sectional portion 51m of the third lens group frame 51 also have a function to prevent the biasing arm portion 38c from coming in contact with any nearby parts other than the spring hook 51h upon the biasing arm portion 38c being brought into engagement with the spring hook 51h. The biasing arm portion 38c serves as a force-applied portion capable of swinging about a swing axis 38x (fulcrum) substantially coincident with the axis of the coiled portion 38a (i.e., capable of swinging in a swing plane substantially parallel to the vertical plane P1). In other words, the biasing arm portion 38c is swingable about the swing axis 38x which is substantially orthogonal to the optical axis O.

Figure 13:
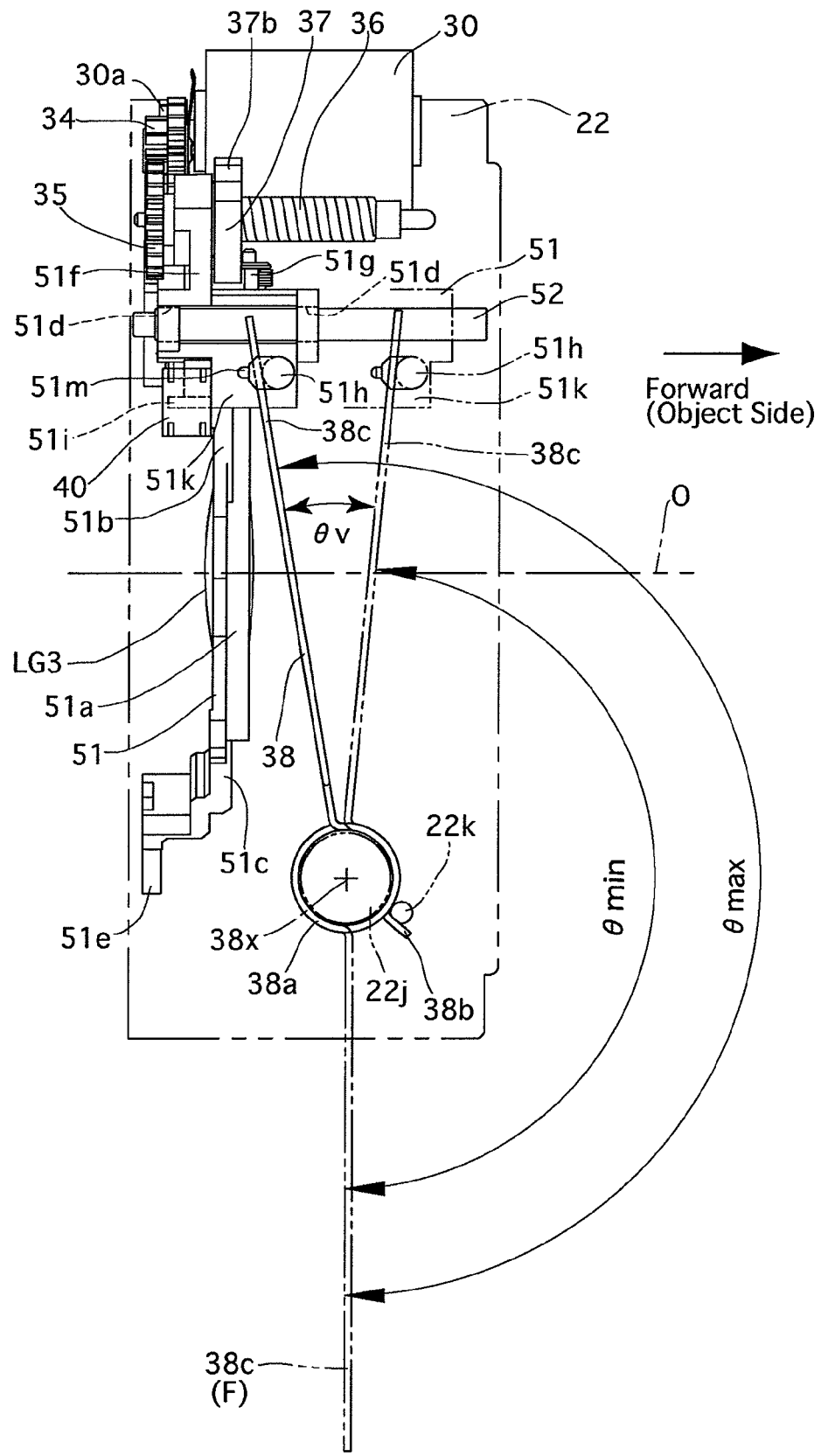
FIG. 13 is a side elevational view of the third lens group frame and the position control mechanism therefor, showing the operation of the torsion spring of the position control mechanism that biases the third lens group frame.

When in a free state where the biasing arm portion 38c is not hooked on the spring hook 51h, the biasing arm portion 38c extends vertically downward from the coiled portion 38a with respect to FIG. 13 as shown by a two-dot chain line designated by a reference numeral 38c(F) in FIG. 13. From this state, rotating the biasing arm portion 38c by a substantially half rotation counterclockwise with respect to 38c(F) of FIG. 13 and hooking a portion of the biasing arm portion 38c at the free end thereof onto the rear surface of the spring hook 51h in the optical axis direction, the amount of resilient deformation (twist) of the torsion spring 38 increases, and the resilience of the torsion spring 38 acts as a load on the spring hook 51h which makes the biasing arm portion 38c press against the spring hook 51h in a direction toward the front of the optical axis direction. Namely, the torsion spring 38 comes into a force-applied state in which a biasing force of the torsion spring 38 toward the front in the optical axis direction is applied to the third lens group frame 51 via the biasing arm portion 38c.

Figure 9:
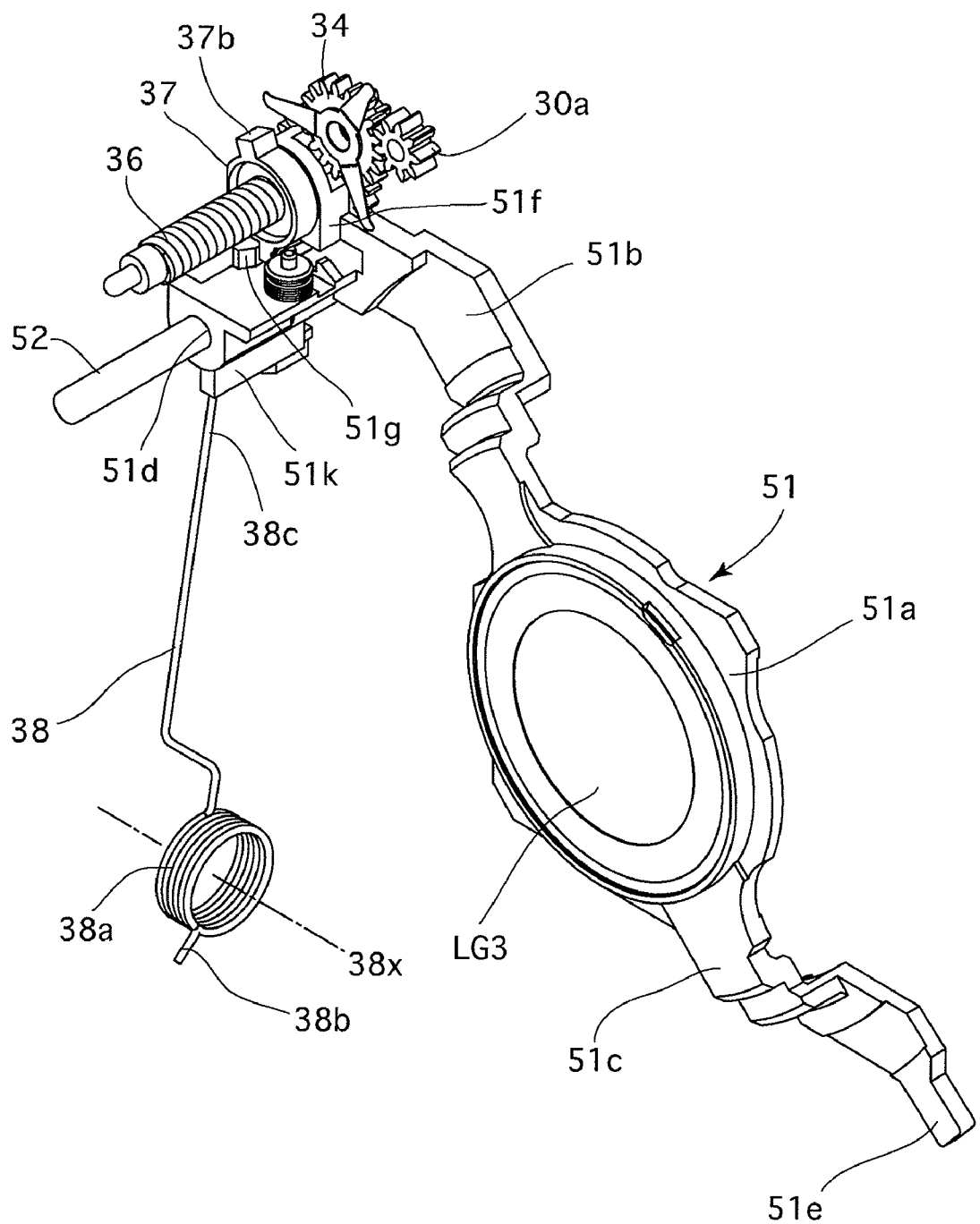
FIG. 9 is a front perspective view of the third lens group frame and main parts of the position control mechanism therefor.
Figure 10:
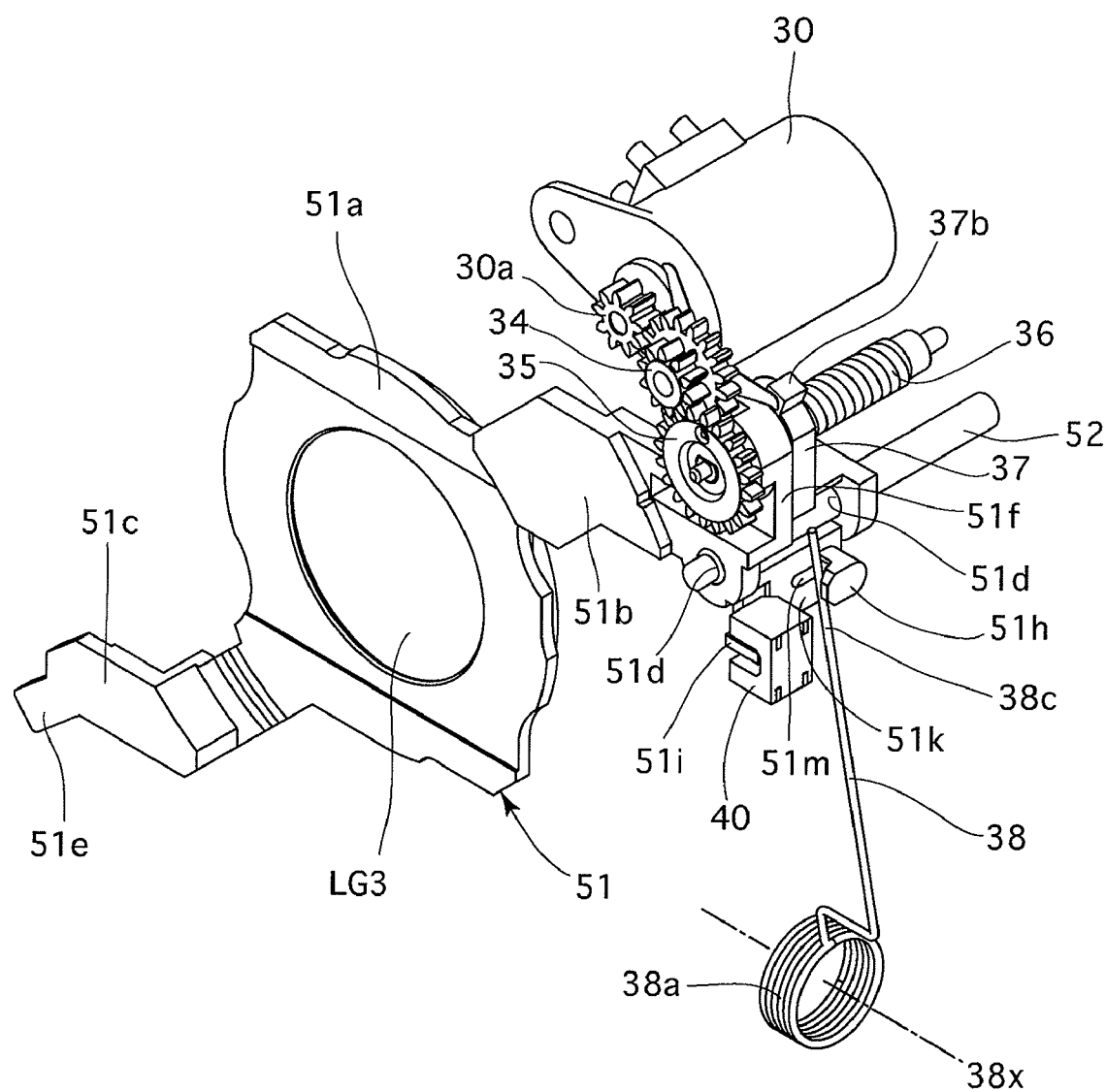
FIG. 10 is a rear perspective view of the third lens group frame and main parts of the position control mechanism therefor.

In this manner, the third lens group frame 51, to which a biasing force toward the front in the optical axis direction is applied by the torsion spring 38, is prevented from moving forward by the abutment of the nut abutting portion 51f against the AF nut 37. Namely, as shown in FIGS. 9, 10 and 13, the third lens group frame 51 is held with the nut abutting portion 51f being in contact with the AF nut 37 by the biasing force of the torsion spring 38, and the position of the third lens group frame 51 in the optical axis direction is determined according to the AF nut 37. Since the AF nut 37 is moved forward and rearward in a direction parallel to the optical axis O via the lead screw 36 by rotating the pinion 30a of the AF motor 30 forward and reverse, the position of the third lens group frame 51 in the optical axis direction is thus controlled in accordance with the driving direction and the driving amount of the AF motor 30. For instance, if the AF nut 37 is moved forward by the AF motor 30, the third lens group frame 51 follows the forward movement of the AF nut 37 via the biasing force of the torsion spring 38 to move forward by the amount of the forward movement of the AF nut 37. Conversely, if the AF nut 37 is moved rearward from the forward moved position thereof, the AF nut 37 presses the nut abutting portion 51f rearward, so that the third lens group frame 51 is moved rearward against the biasing force of the torsion spring 38.

An origin position sensor 40 for detecting the limit of rearward movement of the third lens group frame 51 in the optical axis direction that is moved by the AF motor 30 is installed in the housing 22. The origin position sensor 40 is made of a photo-interrupter which includes a body having a U-shaped cross section with a light emitter and a light receiver which are provided thereon so as to face each other with a predetermined distance therebetween, and it is detected that the third lens group frame 51 is positioned at the limit of rearward movement thereof when a sensor interrupt plate 51i formed integral with the third lens group frame 51 passes between the light emitter and the light receiver. The AF motor 30 is a stepping motor. The amount of movement of the third lens group LG3 when a focusing operation is performed is calculated as the number of steps for driving the AF motor 30 with the limit of rearward movement being taken as the point of origin.

The limit of rearward movement of the third lens group frame 51 in the range of movement thereof that is controlled by the AF motor 30 is shown by a solid line in FIG. 13, and the limit of forward movement of the third lens group frame 51 in the same range of movement thereof is shown by a two-dot chain line in FIG. 13. FIG. 15A shows variations in load of the torsion spring 38 in accordance with positional variations of the third lens group frame 51 in the optical axis direction. The degree of the swing angle of the biasing arm portion 38c of the torsion spring 38 from the position in a free state thereof when the third lens group frame 51 is at the limit of rearward movement is represented by θmax, and the degree of the swing angle of the biasing arm portion 38c of the torsion spring 38 from the position in a free state thereof when the third lens group frame 51 is at the limit of forward movement is represented by θmin (see FIG. 13). In addition, the loads of the torsion spring 38 which correspond to the swing angles θmin and θmax are represented by Fmin and Fmax, respectively. As can be seen from FIG. 13, the amount of angular displacement θv between the minimum swing angle θmin and the maximum swing angle θmax when the torsion spring 38 is in the aforementioned force-applied state is far smaller than the minimum swing angle θmin that ranges from a free state of the torsion spring 38 until when the torsion spring 38 comes into the force-applied state. Therefore, the variation from the minimum load Fmin to the maximum load Fmax in the range of movement of the third lens group frame 51 can be reduced to a minimum.

Figure 14:
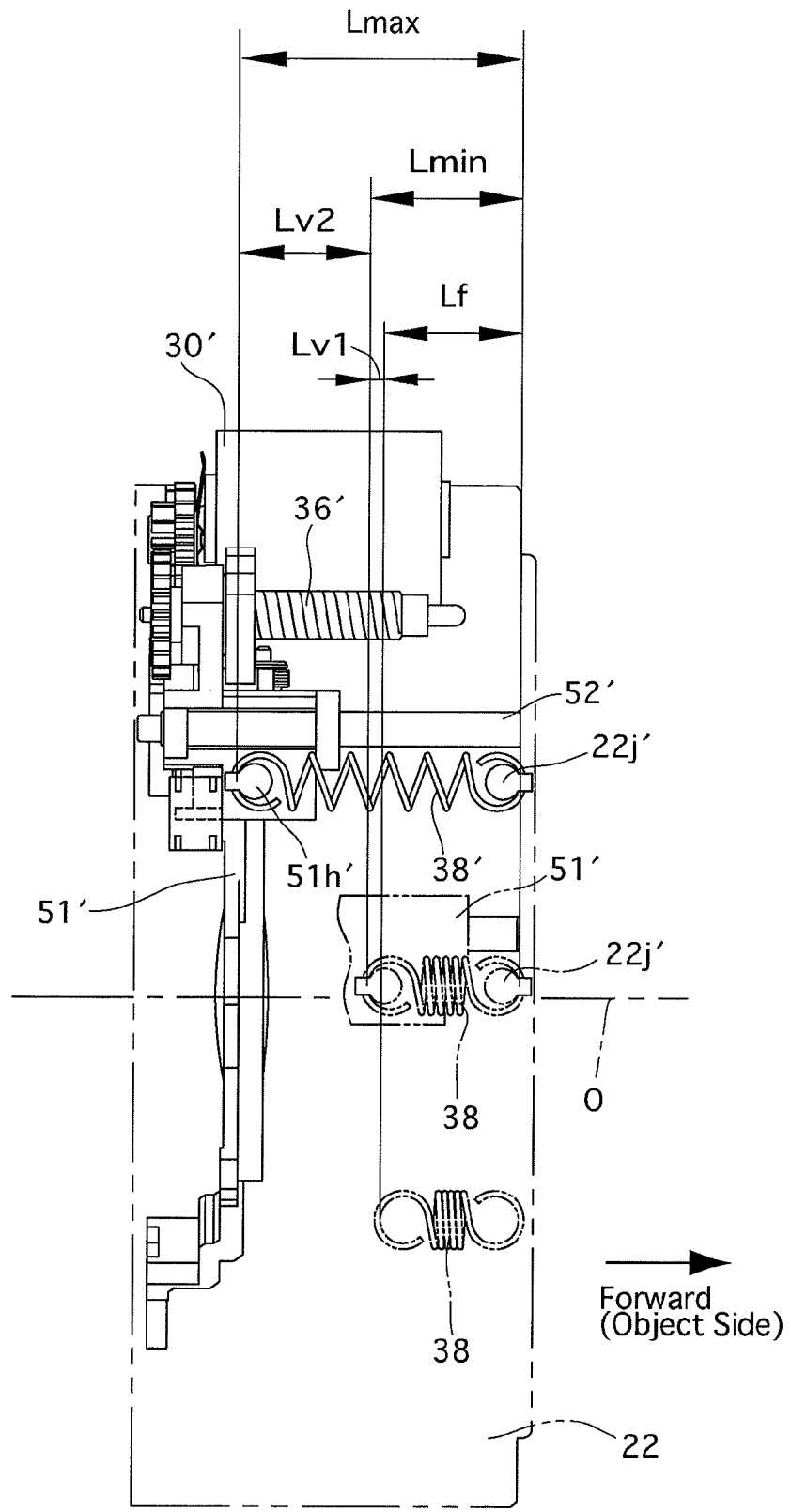
FIG. 14 is a side elevational view of the third lens group frame and the position control mechanism therefor in a comparative example that uses an extension spring as the biasing device for biasing the third lens group frame.

FIG. 14 shows a comparative example in which the torsion spring 38 is replaced by an extension spring 38' which expands and contracts in a direction parallel to the optical axis O. One end of the extension spring 38' is hooked onto a spring hook 51h' of a third lens group frame 51' (which corresponds to the third lens group frame 51) and the other end of the extension spring 38' is hooked onto a spring hook 22j' of a housing 22' (which corresponds to the housing 22). The third lens group frame 51' is movable forward and rearward in the optical axis direction along a third lens group guide shaft 52' (which corresponds to the third lens group guide shaft 52), and the limit of rearward movement and the limit of the forward movement of the third lens group frame 51' in the range of movement thereof that is controlled by an AF motor 30' (which corresponds to the AF motor 30) are represented by a solid line and a two-dot chain line, respectively. In addition, in FIG. 14, the length of the extension spring 38' with the position of engagement with the spring hook 22j' of the housing 22' as a reference position when the third lens group frame 51 is at the limit of forward movement thereof is represented by Lmin, and the length of the extension spring 38' with the position of engagement with the spring hook 22j' of the housing 22' as a reference position when the third lens group frame 51 is at the limit of rearward movement thereof is represented by Lmax. Since the spring hook 22j', the position of which is fixed, is positioned at the front of the optical element position control mechanism, the extension spring 38' becomes longest (Lmax) when the third lens group frame 51' is positioned at the limit of rearward movement thereof. Lf shown in FIG. 14 designates the length of the extension spring 38' when it is in a free state.

FIG. 15B shows variations in load of the extension spring 38' in the comparative example shown in FIG. 14. Fmin' in FIG. 15B represents the spring load when the length of the extension spring 38' is Lmin, and Fmax' in FIG. 15B represents the spring load when the length of the extension spring 38' is Lmax. As can be understood from FIG. 14, the displacement Lv2 between the minimum length Lmin and the maximum length Lmax (in a force-applied state where a biasing force of the extension spring 38' toward the front in the optical axis direction is applied to the third lens group frame 51') is far greater than the displacement Lv1 from the length Lf (the length when the extension spring 38' is in a free state) until when the extension spring 38' comes into the force-applied state. Since the magnitude of the load of the extension spring 38' varies in proportion to the variation in length of the extension spring 38', the difference between the load Fmin' when the length of the extension spring 38' is the minimum length Lmin and the load Fmax' when the length of the extension spring 38' is the maximum length Lmax becomes extremely large in the extension spring 38'. In addition, the AF motor 30' needs to be a high-power motor in order to cope with the maximum load Fmax'.

To reduce the load variation, namely, to reduce the difference in length of the extension spring 38' between the maximum length Lmax and the minimum length Lmin, it is conceivable that an extension spring having a longer length in a free state will be adopted as the extension spring 38'. However, if such a long extension spring is adopted as the extension spring 38', a corresponding larger space will be necessary, which runs counter to the demand for miniaturization of the zoom lens barrel. The comparative example shown in FIG. 14 is substantially identical in structure to the embodiment shown in FIG. 13 except for the extension spring 38'. If an extension spring having a longer length is adopted as the extension spring 38', the spring hook 22j' has to be provided in front (on the right-hand side with respect to FIG. 14) of the position of the front end of the zoom lens barrel (which substantially corresponds to the position of the front end of the housing 22') in the accommodated state. Namely, adopting an extension spring having a longer length as the extension spring 38' causes an increase in length of the zoom lens barrel in the accommodated state. In this respect, a maximum length which is structurally possible in the zoom lens barrel has been given to the extension spring 38' in the comparative example shown in FIG. 14, and accordingly, it is difficult to reduce the load variation to a small degree more than the degree shown in FIG. 15B while maintaining the current size of the zoom lens barrel in the accommodated state, so that it is impossible to satisfy both the demand for miniaturization of the zoom lens barrel and the demand for a reduction of the load variation simultaneously.

If the range of movement of the third lens group frame 51' is reduced (if the limit of rearward movement of the third lens group frame 51' is set in front of that shown by a solid line in FIG. 14), it is possible to reduce the maximum load of the extension spring 38' with no need to lengthen the length of the extension spring 38' in a free state; however, such a reduction of the range of movement of the third lens group frame 51' inevitably limits the range of movement of the third lens group LG3, so that a required optical performance may not be obtained. Accordingly, it is not practical to reduce the range of movement of the third lens group frame 51'.

Although the extension spring 38' is used in the comparative example shown in FIG. 14, the same problem arises even if the extension spring 38' is replaced by a compression spring. Namely, regardless of as to whether the spring member for biasing the third lens group frame 51' is an extension spring or a compression spring, it is difficult to achieve a balance between miniaturization of the zoom lens barrel and a reduction of the load variation of the spring member in the particular biasing structure in which the spring member which expands and contracts in the direction of forward/rearward movement of the third lens group frame 51' is directly connected between the third lens group frame 51' and a stationary member (the housing 22').

In contrast, in the above described embodiment of the optical element position control mechanism that uses the torsion spring 38 as a biasing device for biasing the third lens group frame 51, the load variation of the torsion spring 38 is far smaller than that in the comparative example and also the maximum load of the spring is smaller than that in the comparative example even though the torsion spring 38 is a biasing device installed in an installation space which is equal in size to that in the comparative example as can be understood by the comparison between the graphs in FIGS. 15A and 15B. As a result, the energy required for driving the third lens group frame 51 is averaged at a low level, which makes it possible to reduce the power consumption of the AF motor 30. In other words, a power-saving type of AF motor can be adopted as the AF motor 30. In addition, since the load variation in accordance with movement of the third lens group frame 51 is small, the third lens group frame 51 can be driven smoothly over the entire range of movement thereof; moreover, noise does not easily occur from the drive mechanism for transmitting a driving force from the AF motor 30 to the third lens group frame 51.

As described above, in the torsion spring 38, the amount of angular displacement ($\theta v$) of the biasing arm portion 38c in the force-applied state between the limit of forward movement and the limit of rearward movement of the third lens group frame 51 is smaller than the minimum swing angle ($\theta min$) of the biasing arm portion 38c, which ranges from a free state thereof until when the torsion spring 38 comes into the force-applied state, and a conditional expression "$\theta v/\theta min<1$" is satisfied, which minimizes the load variation in the force-applied state. Although the degree of the minimum swing angle $\theta min$ is set to substantially a half rotation in the embodiment shown in FIG. 13, the amount of angular displacement ($\theta v$) of the biasing arm portion 38c in the working section in the force-applied state can be made relatively small by increasing the value of the minimum swing $\theta$angle min that serves as a denominator of the aforementioned conditional expression (the amount of angular displacement $\theta v$ is constant since the maximum swing angle $\theta max$ increases as the minimum swing angle $\theta min$ increases), which makes it possible to achieve a further reduction of the difference between the maximum load and the minimum load of the torsion spring 38. Although the load variation is effectively suppressed by satisfying the conditional expression "$\theta v/\theta min<1$", a better effect is obtained if a conditional expression "$\theta v/\theta min<0.5$" is satisfied. As a practical technique to increase the value of the minimum swing angle $\theta min$, the biasing arm portion 38c can be hooked on the spring hook 51h after being twisted through 360-degree or more about the coiled portion 38a (about the swing axis 38x) from a free state of the biasing arm portion 38c. Since the torsion spring 38 does not substantially change the size thereof even if the amount of resilient deformation of the torsion spring 38 in a rotation direction about the axis of the coiled portion 38a (the swing axis 38x) is increased, the space for the installation of the torsion spring 38 does not have to be increased, unlike the above described case in the comparative example where an extension spring or a compression spring which has a longer length in a free state is adopted. If conditions such as the thickness of the steel wire of the spring are the same, the load of the torsion spring 38 averagely increases if the amount of resilient deformation of the torsion spring 38 which ranges from a free state thereof until when the torsion spring 38 comes into the force-applied state, so that the amount of resilient deformation of the torsion spring 38 is set within a range in which the maximum load thereof does not become excessively great.

Also, one of the factors which have minimized the load variation of the torsion spring 38 is the length of the biasing arm portion 38c from the coiled portion 38a, about which the biasing arm portion 38c swings, to the force application point (working point) on the third lens group frame 51. The greater the length of the biasing arm portion 38 from the swing axis 38x to the force application point, i.e., the greater the radius of rotation of the swing operation of the torsion spring 38 in the vicinity of the free end thereof, the smaller the displacement angle (θv) of the biasing arm portion 38c per unit of displacement of the third lens group frame 51, thereby making it possible to curb variations in the spring load. Assuming a horizontal plane P2 which is substantially parallel to the swing axis 38x of the torsion spring 38 and includes the optical axis O, the spring hook 51h at which the biasing arm portion 38c is hooked onto the third lens group frame 51 is positioned in the area above the horizontal plane P2 as shown in FIGS. 11 and 23. On the other hand, the spring support projection 22j of the housing 22, which supports the coiled portion 38a that serves as the swing axis of the torsion spring 38, is positioned in the area below the horizontal plane P2. Therefore, the biasing arm portion 38c of the torsion spring 38 is elongated in the vertical direction across the horizontal plane P2. Since the torsion spring 38 is installed radially outside the cam ring 11 that is a rotatable member in the zoom lens barrel 1, it is possible for such a long length to be given to the biasing arm portion 38c without the biasing arm portion 38c interfering with any movable members associated with the first lens group LG1 or the second lens group LG2 that is driven by the cam ring 11.

In addition, also in regard to the shape of the front projection view of the zoom lens barrel 1, the position control mechanism for controlling the position of the third lens group frame 51 that includes the torsion spring 38 has been installed in the zoom lens barrel 1 in a space saving manner. As shown in FIG. 11, elements of the zoom lens barrel 1 such as the third lens group guide shaft 52 (which is an element of a guide mechanism for the third lens group frame 51), the AF nut 37, the AF motor 30 and the lead screw 36 (which are elements of the drive mechanism for the third lens group frame 51) are installed in a substantially triangular space formed above the horizontal plane P2 along an outer peripheral surface of the cylindrical portion 22a of the housing 22. The coiled portion 38a of the torsion spring 38 is supported in another substantially triangular space formed below the horizontal plane P2, wherein the two substantially triangular spaces that are respectively formed above and below the horizontal plane P2 are substantially symmetrically positioned with respect to the horizontal plane P2. Although the shapes of front projectional views of optical devices such as a camera to which the zoom lens barrel 1 is mounted are often based on a rectangular shape (e.g., having a rectangular housing), such a configuration makes it possible to accommodate the position control mechanism for controlling the position of the third lens group frame 51 effectively in a dead space created between a rectangular housing portion of the camera and an outer peripheral surface of the cylinder-shaped housing portion 22a. In addition, as can be seen from FIG. 11, the biasing arm portion 38c of the torsion spring 38 is elongated in close vicinity of the cylindrical portion 22a, extending toward the upper triangular space from the lower triangular space in a manner such that the biasing arm portion 38c of the torsion spring 38 is substantially tangent to an outer peripheral surface of the cylindrical portion 22a. Therefore, the installation of the torsion spring 38 outside the cylindrical portion 22a has little effect on the lateral width of the zoom lens barrel 1.

As described above, the mechanism for biasing the third lens group frame 51 by the torsion spring 38 in the above described embodiment of the optical element position control mechanism can reduce load on the AF motor 30 to thereby achieve a reduction in power consumption of the AF motor 30 while contributing to miniaturization of the zoom lens barrel 1, especially to a reduction of the length of the zoom lens barrel 1 in the accommodated state.

Figure 16:
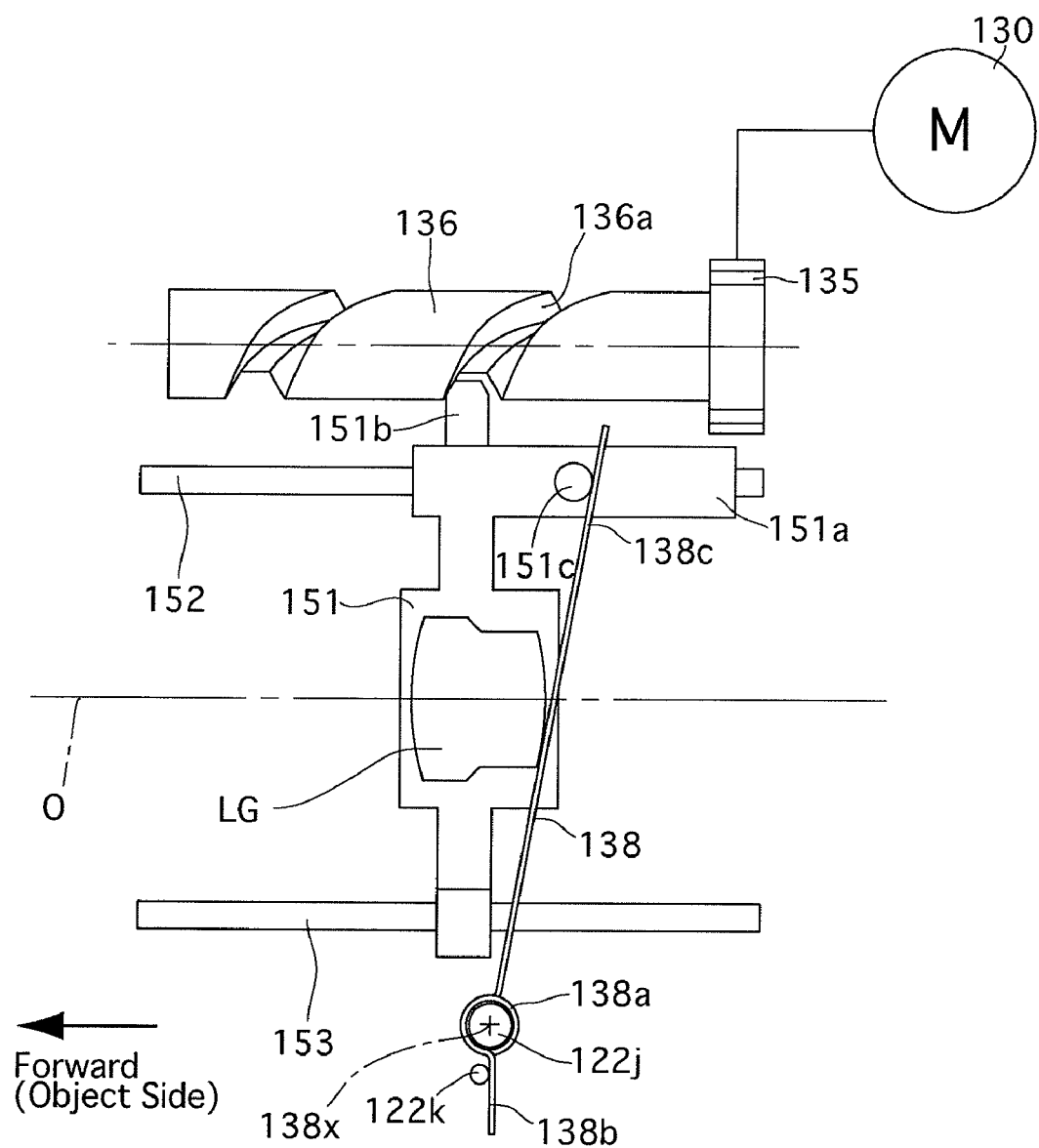
FIG. 16 is a side elevational view of a second embodiment of the optical element position control mechanism, which is configured to control the position of a lens frame, wherein a lead cam shaft is used instead of the lead screw mechanism used in the first embodiment of the optical element position control mechanism that is shown in FIG. 1 through 13.
Figure 17:
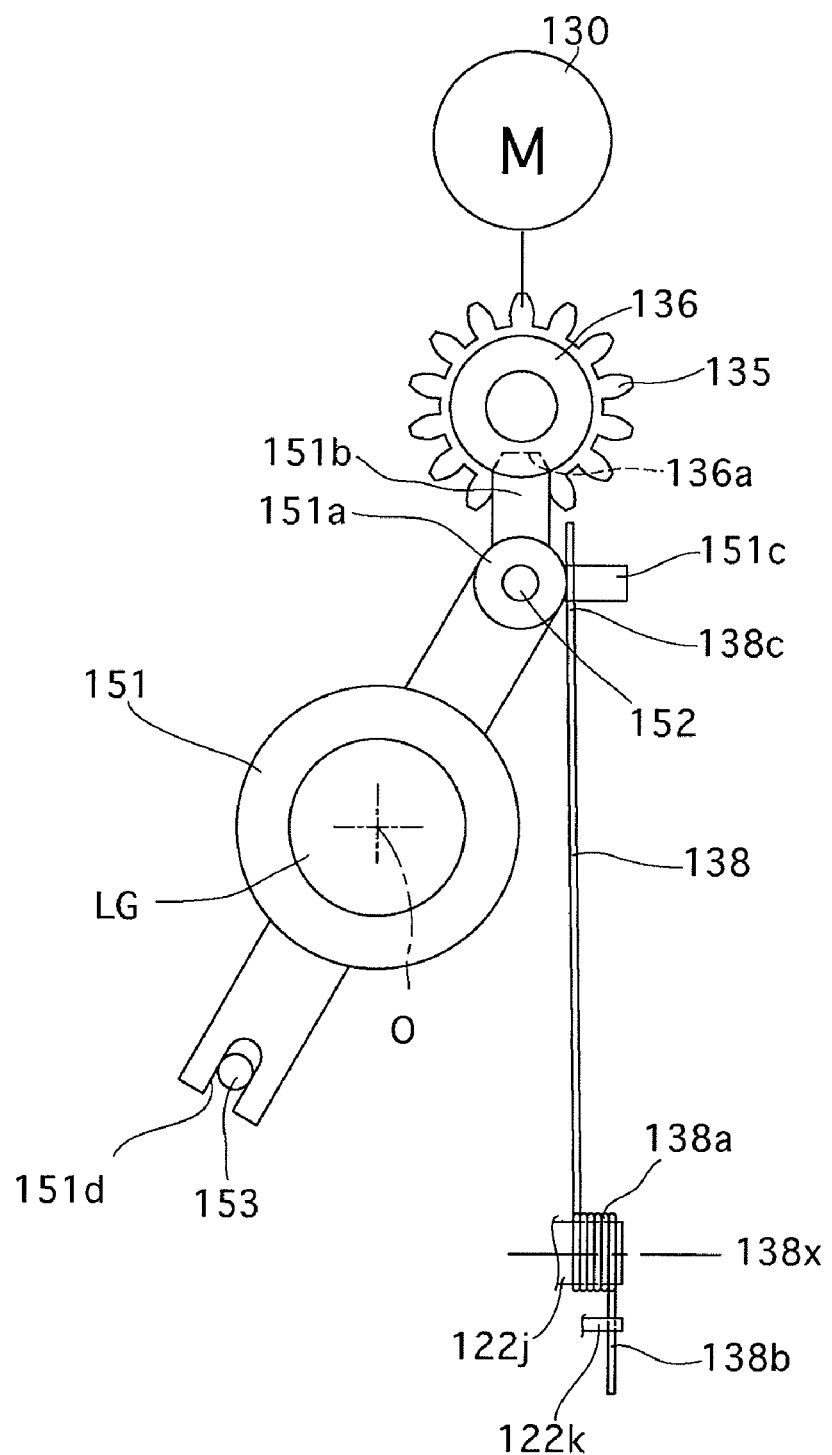
FIG. 17 is a front elevational view of the second embodiment of the optical element position control mechanism shown in FIG. 16.

A second embodiment of the optical element position control mechanism according to the present invention will be hereinafter discussed with reference to FIGS. 16 and 17. Movements of the third lens group frame 51 are controlled by the lead screw 36 and the AF nut 37 in the first embodiment of the optical element position control mechanism. However, in the second embodiment of the optical element position control mechanism, instead of a lead screw, a lead cam shaft (an element of a drive mechanism/a guide member) 136 is used as an element of a drive mechanism for driving a lens frame (optical element holding member) 151 which holds a lens group LG. The lens frame 151 is guided linearly in a direction parallel to the optical axis O by a guide shaft (advancing/retracting movement guide member) 152 and an anti-rotation shaft 153 which extend parallel to the optical axis O. The guide shaft 152 is slidably inserted into a guide hole formed through a cylindrical portion 151a of the lens frame 151, and the anti-rotation shaft 153 is slidably engaged in an anti-rotation groove 151d formed on a portion of the lens frame 151 on the opposite side of the lens frame 151 from the cylindrical portion 151a, wherein the anti-rotation groove 151d and the cylindrical portion 151a are substantially symmetrically positioned with respect to the optical axis O. A guide pin (an element of the drive mechanism/a follower) 151b projects from the cylindrical portion 151a that is guided by the guide shaft 152. The guide pin 151b is engaged in a lead groove 136a formed on a peripheral surface of the lead cam shaft 136. The lead groove 136a includes a pair of axially opposed guide surfaces which are inclined with respect to the direction of the optical axis O, and a predetermined clearance is created between the guide pin 151b and the pair of axially opposed guide surfaces to allow the guide pin 151b to slide thereon. The lead cam shaft 136 is provided at one end thereof with a gear 135. By applying a torque to the lead cam shaft 136 via the gear 135 by a motor (an element of the drive mechanism) 130 causes the lead cam shaft 136 to rotate about an axis of rotation parallel to the optical axis O. Thereupon, the guide pin 151b is guided while sliding on the pair of axially opposed guide surfaces of the lead groove 136a, which causes the lens frame 151 to move in the optical axis direction.

A torsion spring (biasing device) 138 is supported by an outer peripheral surface of a cylinder-shaped spring support projection (swing movement support portion) 122*j* with a coiled portion (swing center portion) 138*a* of the torsion spring 138 being fitted on the spring support projection 122*j* and with the axis of the coiled portion 138*a* extending in a direction orthogonal to the optical axis O. The position of the spring support projection 122*j* is fixed. The torsion spring 138 includes a support arm portion (second arm portion) 138*b* and a biasing arm portion (arm/first arm portion) 138*c* both of which project radially outwards from the coiled portion 138*a*, and the support arm portion 138*b* is engaged with a fixed projection 122*k* while the free end of the biasing arm portion 138*c* is engaged with a spring hook (projection) 151*c* of the lens frame 151. In this spring-engaged state, the biasing arm portion 138*c* of the torsion spring 138 can swing about a swing axis 138*x* which is substantially orthogonal to the optical axis O and substantially coincident with the axis of the coiled portion 138*a* that is supported by the spring support projection 122*j*, and biases the lens frame 151 forward in the optical axis direction (leftward direction with respect to FIG. 16). This biasing force causes the guide pin 151*b* to be pressed against one of the pair of axially opposed guide surfaces of the lead groove 136*a* which is closer to the front in the optical axis direction to eliminate backlash between the guide pin 151*b* and the lead groove 136*a*. Since the spring hook 151*c* is formed at substantially a center of the cylindrical portion 151*a* in the lengthwise direction thereof, a tilting moment acting on the cylindrical portion 151*a* to tilt the cylindrical portion 151*a* relative to the guide shaft 152 does not easily occur upon the spring hook 151*c* receiving the load of the torsion spring 138, which ensures smooth movement of the lens frame 151 in the optical axis direction.

According to the torsion spring 138, in a similar manner to the torsion spring 38 of the first embodiment, variations of the spring load in the force-applied state can be reduced and loads on the motor 130 can be reduced when the lens frame 151 is moved forward and rearward in the optical axis direction via the motor 130 and the lead cam shaft 136. In addition, similar to the position control mechanism for controlling the position of the third lens group frame 51 that includes the torsion spring 38, the space for the installation of the torsion spring 138 does not increase even if the amount of rotation of the biasing arm portion 138*c* is changed when the torsion spring 138 is brought to come into the force-applied state from a free state, hence, the position control mechanism for controlling the position of the lens frame 151 that includes the torsion spring 138 is installed in a space saving manner. Additionally, as can be understood from the second embodiment shown in FIGS. 16 and 17, the application of the biasing device to an optical element holding member in the present invention is not limited to the application like that in the first embodiment which is directly concerned in the driving operation of a forward/rearward moving member, and the biasing device can also be used to eliminate backlash, just like the torsion spring 138. As a drive mechanism for driving a holding member such as the lens frame 151, the present invention is not limited solely to the above described particular structure using a combination of a groove and a projection like a combination of the lead groove 136 and the guide pin 151*b*; for instance, a structure using a face cam (end-face cam) or the like is possible. In short, the present invention is widely applicable so long as the drive mechanism is of a type which is required to eliminate backlash between a guide surface and a follower which is in sliding contact with the guide surface.

The torsion spring 38 that is made of a single torsion spring in the above described first embodiment is the biasing device which biases the third lens group frame 51, and the torsion spring 138 that is made of a single torsion spring in the above described second embodiment is the biasing device which biases the lens frame 151. However, the biasing device is not limited to such a single torsion spring if the biasing device satisfies the requirement that the biasing device gives a biasing force to the optical element holding member (51 or 151) via a swingable force-applied portion (arm) capable of swinging about the swing axis which is substantially orthogonal to the optical axis of the optical element held by the optical element holding member.

Third through fifth embodiments of zoom lens barrels that use different biasing devices will be hereinafter discussed with reference to FIGS. 18 through 22. Each embodiment which will be discussed below is similar in structure to the first embodiment except for the biasing device and the structure associated therewith, and elements which are similar to those of the first embodiment of the optical element position control mechanism are designated by the same reference numerals and given the same member names.

Figure 18:
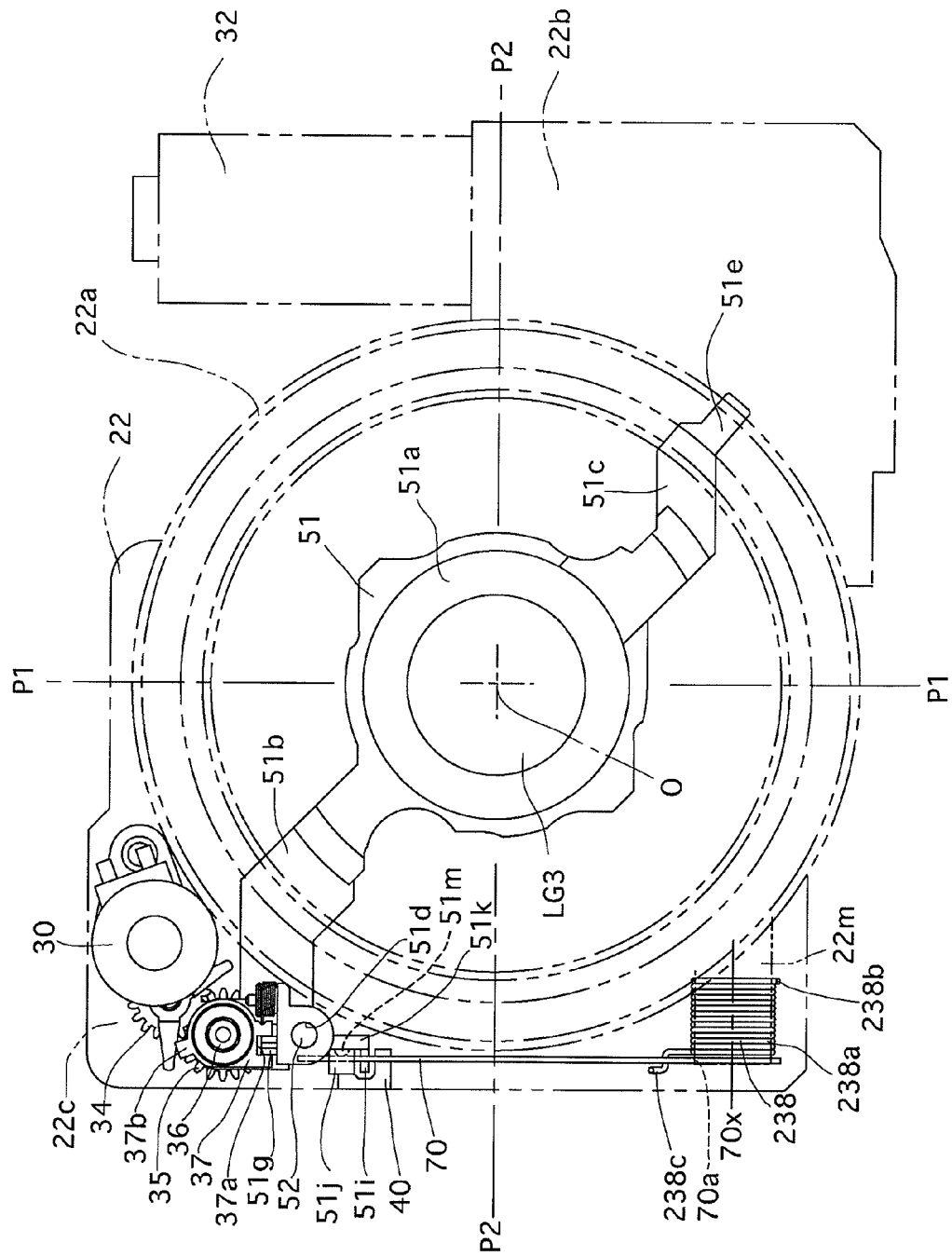
FIG. 18 is a front elevational view of a third embodiment of the optical element position control mechanism, mainly showing the third lens group frame and the position control mechanism therefor, wherein a combination of a lever and a torsion spring is used as a biasing device for biasing the third lens group frame.
Figure 19:
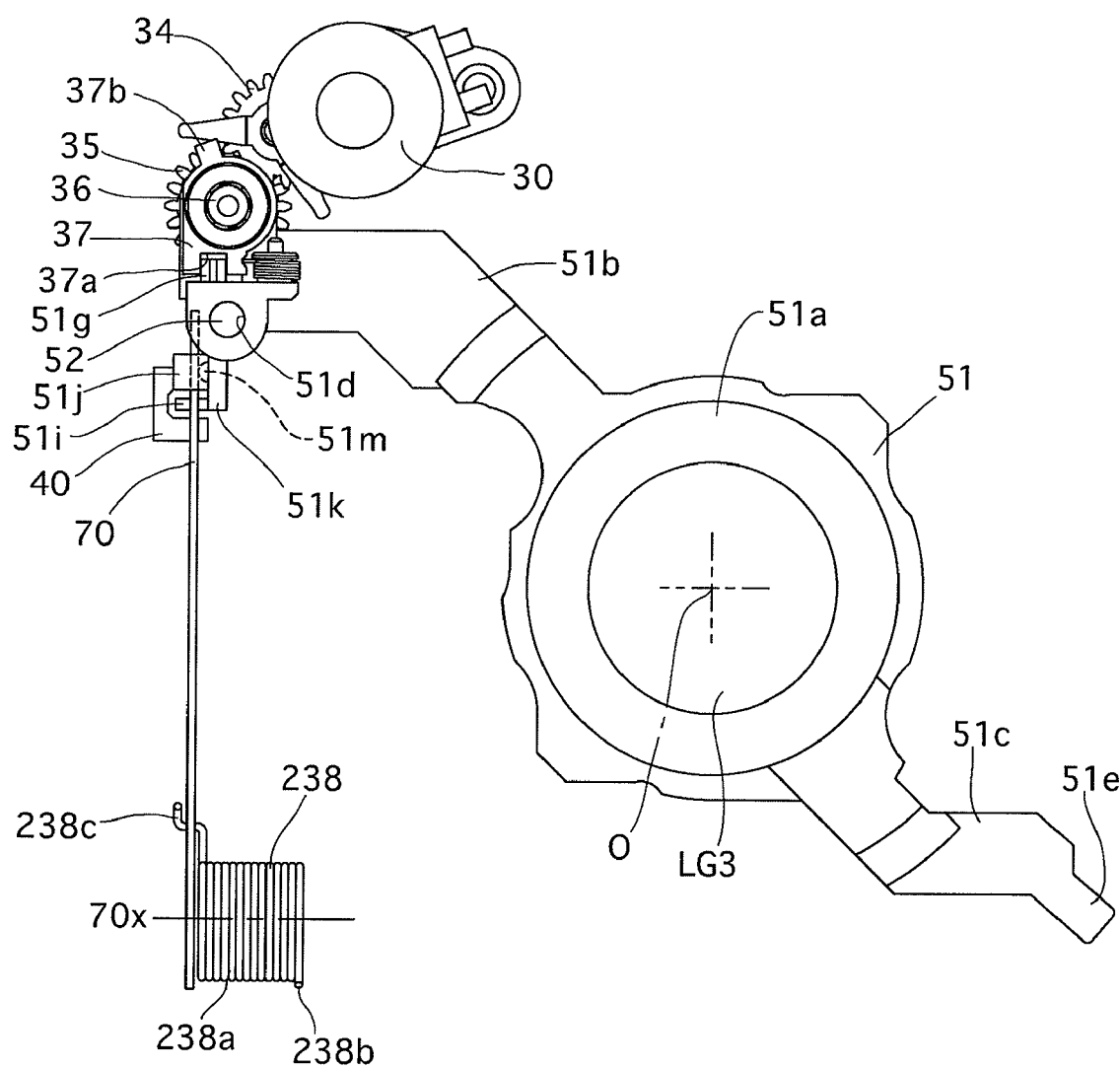
FIG. 19 is a front elevational view of the third lens group frame and the position control mechanism therefor that are shown in FIG. 18.
Figure 20:
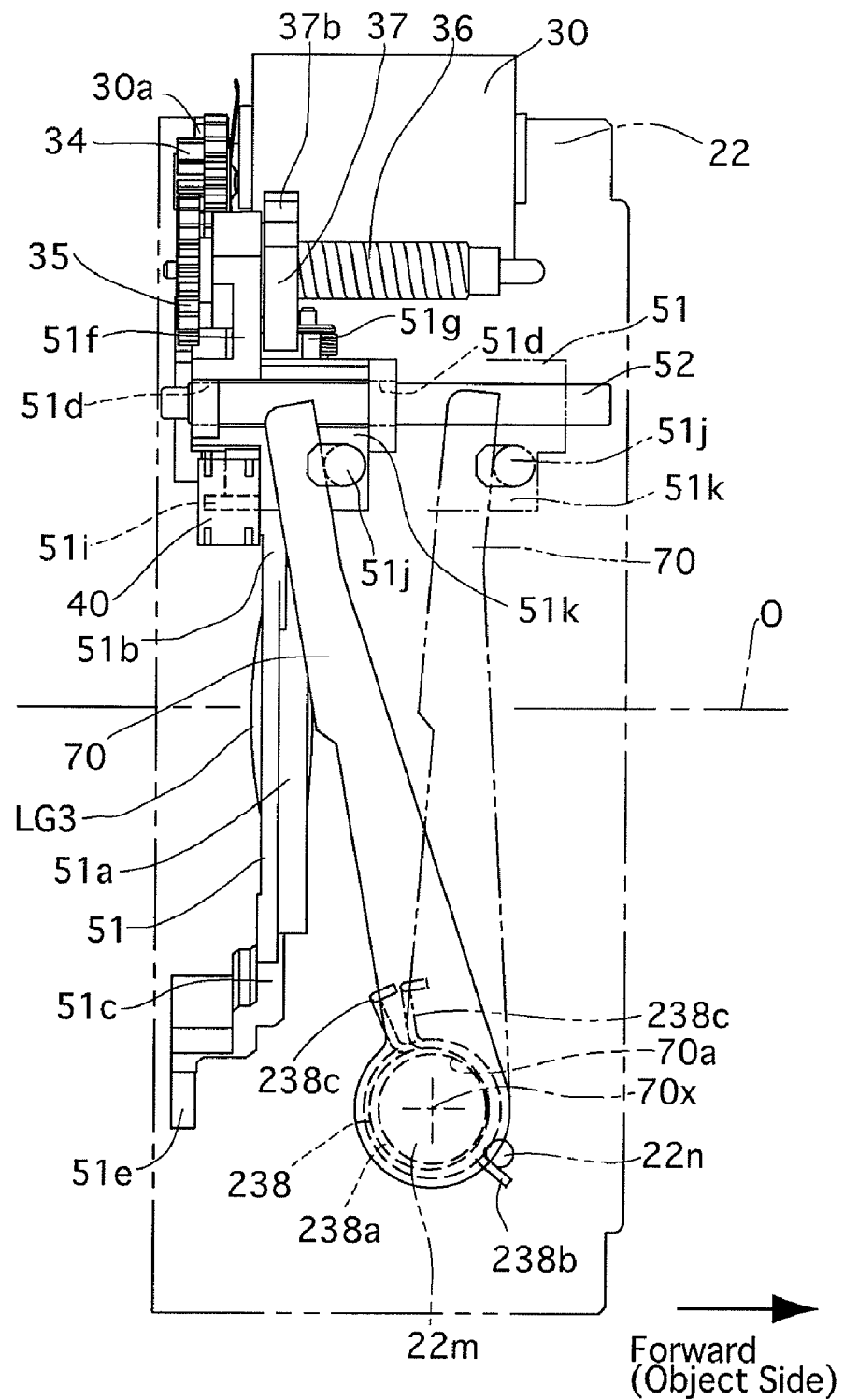
FIG. 20 is a side elevational view of a third embodiment of the optical element position control mechanism, which is configured to control the position of the third lens group frame, showing the operations of the lever and the torsion spring.

In the third embodiment shown in FIGS. 18 through 20, the biasing device for biasing the third lens group frame 51 is composed of a combination of swing lever (arm/lever) 70 and a torsion spring (lever biasing member) 238. The housing 22 is provided with a swing support projection (swing movement support portion/swing center portion) 22*m* which projects laterally from the housing 22 (so that the axis of the swing support projection 22*m* extends in a direction substantially orthogonal to the vertical plane P1), and the swing lever 70 is provided at one end thereof with a shaft hole 70*a* into which the swing support projection 22*m* is inserted so that the swing lever 70 is freely rotatable about the swing support projection 22*m* and swingable about a swing axis 70*x* (fulcrum) which is substantially orthogonal to the optical axis O and substantially coincident with the axis of the swing support projection 22*m*. The other end (free end) of the swing lever 70 engages with a lever engaging projection 51*j* formed on the third lens group frame 51. The coiled portion 238*a* of the torsion spring 238 is fitted on the swing support projection 22*m* to be supported by the outer peripheral surface of the swing support projection 22*m*. The torsion spring 238 biases the swing lever 70 clockwise with respect to FIG. 20 with a support arm portion (second arm portion of the lever biasing member) 238*b* and a biasing arm portion (first arm portion of the lever biasing member) 238*c* being hooked onto a fixed projection (spring-hooked portion) 22*n* of the housing 22 and a portion of the swing lever 70 in the vicinity of the swing support projection 22*m*, respectively, wherein each of the support arm portion 238*b* and the biasing arm portion 238*c* extends radially outwards from the coiled portion 238*a*. The biasing force of the torsion spring 238 on the swing lever 70 is exerted in a manner so as to press the third lens group frame 51 forward in the optical axis direction via the lever engaging projection 51*j*.

The swing lever 70 itself has no resiliency in the swinging direction thereof. However, with a biasing force given to the swing lever 70 from the torsion spring 238, a combination of the biasing arm portion 238*c* of the torsion spring 238 and the swing lever 70 substantially functions as a swingable force-applied portion, similar to the biasing arm portion 38*c* of the torsion spring 38 in the first embodiment of the optical element position control mechanism or the biasing arm portion 138*c* of the biasing spring 138 in the second embodiment of the optical element position control mechanism. Therefore, just like the biasing devices of the previous (first and second) embodiments, the load on the AF motor 30 can be reduced by reducing the load variation in the force-applied state to the third lens group frame 51 even through the biasing device can be arranged in a space-saving manner in the optical axis direction. Unlike the third embodiment, it is possible to make the coiled portion 238a of the torsion spring 238 supported by a support portion different from the swing support projection 22m of the swing lever 70.

Figure 21:
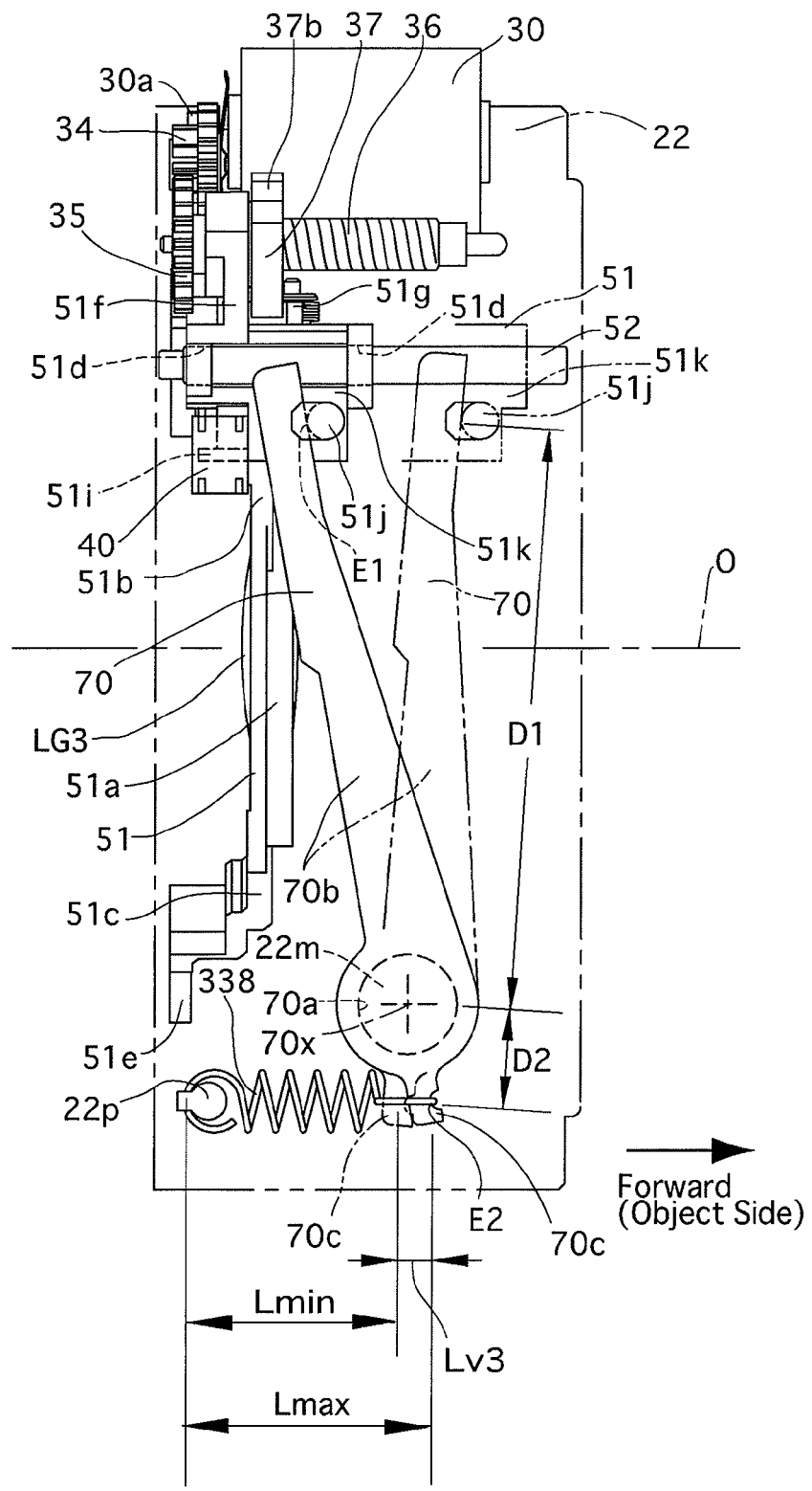
FIG. 21 is a side elevational view of a fourth embodiment of the optical element position control mechanism, which is configured to control the position of the third lens group frame, wherein a combination of a lever and an extension spring is used as a biasing device for biasing the third lens group frame.

A fourth embodiment shown in FIG. 21 is similar to the third embodiment shown in FIGS. 18 through 20 except that the torsion spring 238 is replaced by an extension spring (lever biasing member) 338 as a biasing member for biasing the swing lever 70 that is adopted in the third embodiment. The swing lever 70 is provided with a main arm 70b which extends from the pivoted portion (shaft hole 70a) of the swing lever 70 in a direction to engage with the lever engaging projection 51j of the third lens group frame 51, and is further provided with a spring-hooked arm (spring-hooked portion) 70c which extends from the pivoted portion (shaft hole 70a) of the swing lever 70 in a direction substantially opposite to the direction of extension of the main arm 70b. The extension spring 338 is installed so that the axis thereof extends substantially parallel to the optical axis O with one and the other ends of the extension spring 338 being hooked on the spring-hooked arm 70c and a spring hook 22p formed on the housing 22, respectively. In the swing lever 70, a distance D1 from the swing axis 70x to an engaging portion E1 of the swing lever 70 which engages with the lever engaging projection 51j is greater than a distance D2 from the swing axis 70x to an engaging portion E2 of the swing lever 70 which engages with the extension spring 338; namely, D1>D2. Due to the ratio (lever ratio) between the length of the main arm 70b and the spring-hooked arm 70c, the amount of movement of the engaging portion E1 on the main arm 70b (the amount of rotation of the engaging portion E1 about the swing axis 70x) per unit of movement of the third lens group frame 51 in the optical axis direction is greater than the amount of movement the engaging portion E2 on the spring-hooked arm 70c (the amount of rotation of the engaging portion E2 about the swing axis 70x) per unit of movement of the third lens group frame 51 in the optical axis direction. Consequently, as can be understood upon comparison between FIG. 14 and FIG. 21, a displacement Lv3 between the minimum length Lmin and the maximum length Lmax of the extension spring 338 in a force-applied state to the third lens group frame 51 is smaller than the displacement Lv2 of the comparative example shown in FIG. 14, so that the load variation can be reduced to a smaller degree than the case of using a single extension spring as a biasing device for biasing the third lens group frame 51, which makes it possible to lighten the load on the AF motor 30 by reducing the maximum load.

Figure 22:
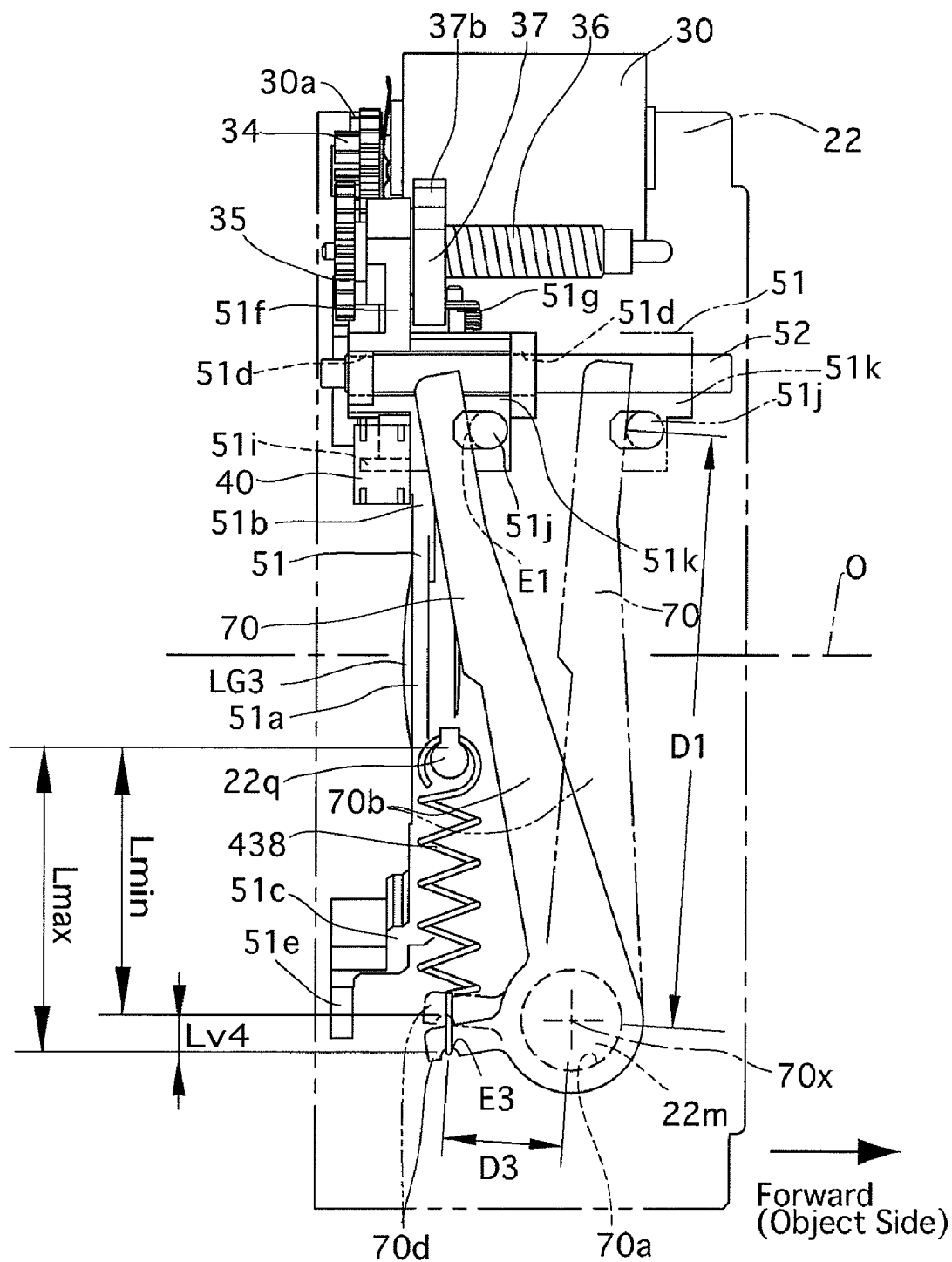
FIG. 22 is a side elevational view of a fifth embodiment of the optical element position control mechanism, which is configured to control the position of the third lens group frame, wherein a combination of a lever and an extension spring is used as a biasing device for biasing the third lens group frame.

A fifth embodiment shown in FIG. 22 is similar to the fourth embodiment shown in FIG. 21 except that the extension spring 338 of the fourth embodiment is replaced by an extension spring (lever biasing member) 438 which is different in tensile direction from the extension spring 338. The swing lever 70 is provided with a spring-hooked arm 70d which projects from the pivoted portion (shaft hole 70a) of the swing lever 70 in a direction substantially orthogonal to the direction of extension of the main arm 70b, i.e., at a substantially right angle relative to the main arm 70b. The extension spring 438 is installed so that the axis thereof extends substantially in the vertical direction of the zoom lens barrel, that corresponds to the direction of elongation of the main arm 70b, with one end of the extension spring 438 being hooked onto the spring-hooked arm 70d and the other end of the extension spring 438 being hooked onto a spring hook 22q formed on the housing 22. In the swing lever 70, the distance D1 from the swing axis 70x to an engaging portion E1 of the swing lever 70 which engages with the lever engaging projection 51j is greater than a distance D3 from the swing axis 70x to an engaging portion E3 of the swing lever 70 which engages with the extension spring 438, namely, D1>D3. Accordingly, when the third lens group frame 51 moves forward and rearward in the optical axis direction, the amount of movement of the engaging portion E1 on the main arm 70b (the amount of rotation of the engaging portion E1 about the swing axis 70x) is greater than the amount of movement the engaging portion E3 on the spring-hooked arm 70d (the amount of rotation of the engaging portion E3 about the swing axis 70x). Consequently, the displacement Lv4 between the minimum length Lmin and the maximum length Lmax of the extension spring 438 in a force-applied state to the third lens group frame 51 is small (smaller than the displacement Lv2 of the comparative example shown in FIG. 14), so that the load variation can be reduced to a smaller degree than the case of using a single extension spring as a biasing device for biasing the third lens group frame 51, which makes it possible to lighten the load on the AF motor 30 by reducing the maximum load.

In the fourth embodiment, it is desirable that the ratio between the length of the main arm 70b of the swing lever 70 (D1) and the length of the spring-hooked arm 70c (D2) satisfy the following conditional expression: D2<D1/2. Likewise, in the fifth embodiment, it is desirable that the ratio between the length of the main arm 70b of the swing lever 70 (D1) and the length of the spring-hooked arm 70d (D3) satisfy the following conditional expression: D3<D1/2.

As can be understood from the fourth and fifth embodiments, with the swing lever 70 provided as a biasing device for biasing the third lens group frame 51, the load variation of the biasing device can be reduced by a structure which is designed compact in the optical axis direction even if an extension spring which expands and contracts in the axial direction thereof is adopted instead of a torsion spring. From this point of view, a similar effect is obtained even if the extension spring 338 or 438 in the fourth or fifth embodiment is replaced by a biasing device composed of a combination of a compression spring and a swing lever.

Although the support arm portion 38b of the torsion spring 38 in the first embodiment, the support arm portion 238b of the torsion spring 238 in the third embodiment, and one end of each of the extension springs 338 and 438 of the fourth and fifth embodiments are each engaged with a projection (22k, 122k, 22n, 22p or 22q) formed on the housing 22, the member on which this projection is formed is not limited to a stationary member such as the housing 22 and can be a movable member as long as the relative position in the optical axis direction between the member on which the projection is formed and at least the optical element holding member corresponding to the third lens group frame 51 varies. Likewise, the support member which pivots the lever member 70 in the third through fifth embodiments is not limited to a stationary member such as the housing 22 and can be a movable member as long as the relative position between the member on which the projection is formed and at least the optical element holding member corresponding to the third lens group frame 51 varies.

In the biasing device in each of the above described embodiments of the zoom lens barrels, the effect of reducing the load variation of the biasing device increases as the distance from the swing axis to the force-applied portion to the optical element holding member is increased. However, increasing this distance causes an increase of the length of the force-applied portion, thus increasing a possibility of the force-applied portion interfering with other elements of the lens barrel. Consequently, the biasing device needs to be installed radially outer part of the lens barrel, not in a radially central portion thereof where movable members are densely arranged. However, if the biasing device is installed in a radially outer part of the lens barrel, it is desirable for the biasing device to be protected because the chance of the biasing device being deformed by elements in the close vicinity thereof contacting the biasing device from the outer side and of positional errors occurring increases. Nevertheless, it is sometimes difficult to protect the biasing device by a housing of the lens barrel.

For instance, in the first embodiment of the optical element holding mechanism, by lengthening the biasing arm portion 38c with the torsion spring 38 being positioned outside the cylindrical portion 22a of the housing 22, the effect of reducing the load variation of the biasing device can be obtained even though the torsion spring 38 is not protected by the housing 22 as shown in FIG. 6. As shown in FIG. 24, the set of three cam ring control grooves 22g are formed on an inner peripheral surface of the cylindrical portion 22a of the housing 22 almost over the entire circumferential range thereof. Due to this structure, the cylindrical portion 22a needs to be a completely cylindrical body with no portions thereof missing in a circumferential direction. Although the housing 22 is made as a molded product of synthetic resin, it is difficult during manufacturing to mold the housing 22 into a housing having a double-walled structure in which the housing further includes a wall portion which is positioned radially outside the cylindrical portion 22a so as to cover the torsion spring 38. More specifically, in order to mold the cylindrical portion 22a, a molding die is removed in a radially outward direction away from the optical axis O after the cylindrical portion 22a is molded, and accordingly, it is conventionally impossible to provide the housing 22 with a wall portion which is shaped so as to cover the torsion spring 38 in the radial removing path of the molding die.

Figure 8:
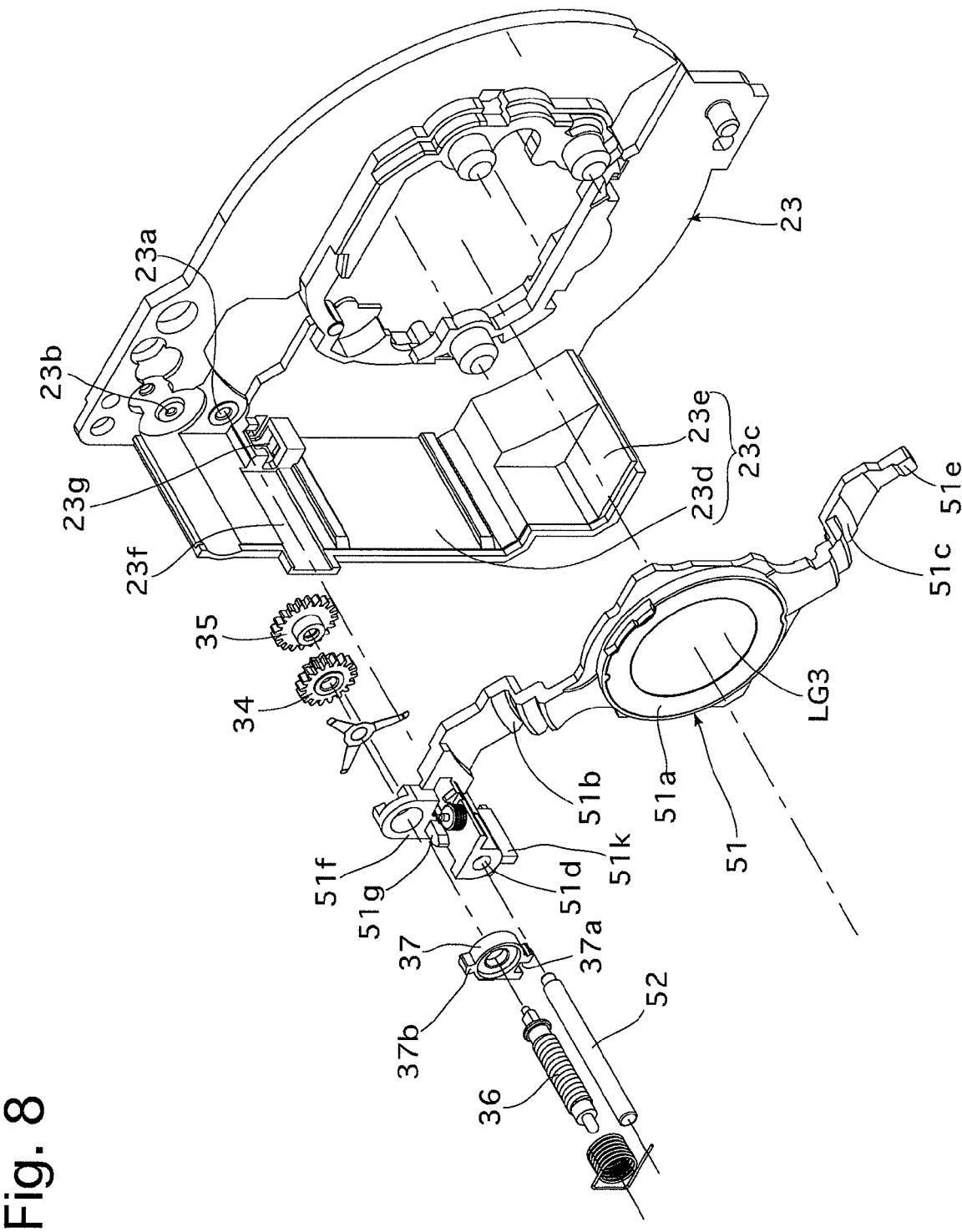
FIG. 8 is a front exploded perspective view of the position control mechanism (optical element position control mechanism) for the third lens group frame.

In order to protect the torsion spring 38 under such conditions, in the zoom lens barrel 1, the image-pickup device holder 23 that is fixed to the back of the housing 22 is provided with a protective wall portion (protective wall member) 23c which covers the outside of the torsion spring 38. As shown in FIGS. 4, 7, 8 and 23, the protective wall portion 23c is provided with a flat side wall portion (flat plate portion) 23d and a box-shaped portion 23e. The side wall portion 23d is substantially parallel to the swinging direction (swing plane) of the biasing arm portion 38c of the torsion spring 38, and the box-shaped portion 23e is positioned to surround the coiled portion 38a of the torsion spring 38 that is positioned below the side wall portion 23d. The front edge of the protective wall portion 23c comes in contact with the front wall portion 22d, and a side edge of the box-shaped portion 23e comes in contact with a lower support portion 22r. The front wall portion 22d and the lower support portion 22r are provided with a stepped portion 22d-1 and a stepped portion 22r-1 which are shaped to be engaged with the aforementioned front edge and the aforementioned side edge of the protective wall portion 23c, respectively. As shown in FIG. 8, the protective wall portion 23c is provided on the inside surface of the side wall portion 23d with an optical-axis-direction groove 23f which prevents the protective wall portion 23c from interfering with the sprig hook 51h when the third lens group frame 51 moves. In addition, the protective wall portion 23c is provided immediately behind the optical-axis-direction groove 23f with a sensor accommodation portion 23g into which the origin position sensor 40 is accommodated.

When the image-pickup device holder 23 is fixed to the housing 22, the image-pickup device holder 23 is made to slide on the housing 22 forwardly with the side edge of the box-shaped portion 23e being slidingly supported by the stepped portion 22r-1 of the lower support portion 22r thereon. Subsequently, upon the main part of the image-pickup holder 23 coming into contact with a rear surface of the housing 22, the front edge of the protective wall portion 23c also comes into contact with the front wall portion 22d and engages with the stepped portion 22d-1. Thereupon, the protective wall portion 23c totally covers the outside of the torsion spring 38 as shown in FIG. 4 by fixing the image-pickup device holder 23 to the housing 22 by set screws, so that the zoom lens barrel 1 is in a protected state. In this protected state, as shown in FIG. 23, the torsion spring 38 is held in a space Q between an outer peripheral surface of the cylindrical portion 22a of the housing 22 and the protective wall portion 23c of the image-pickup device holder 23, and the torsion spring 38 is protected from coming in contact with moving parts inside the zoom lens barrel 1 by the cylindrical portion 22a and further protected external contact from the outside of the zoom lens barrel 1 by the protective wall portion 23c. Therefore, there is no possibility of the torsion spring 38, in particular the biasing arm portion 38c thereof, being irreversibly deformed, i.e., different to the amount of resilient deformation thereof during normal use, by coming in contact with other elements of the zoom lens barrel 1 or an assembly worker's hand, and accordingly, the accuracy of the position control for the third lens group frame 51 does not deteriorate when the zoom lens barrel 1 is in an assembled state.

In this manner, the torsion spring 38 that is positioned outside the housing 22 can be protected from damage because the image-pickup device holder 23 that is fixed to the housing 22 is provided with the protective wall portion 23c that covers the outside of the torsion spring 38 in a state where the image-pickup device holder 23 is fixed to the housing 22. Specifically, the biasing device protective structure for protecting the torsion spring 38 from damage is superior in its capability of reliably protecting the torsion spring 38 independently of the shape of the housing 22 even in a structure in which it is difficult to form a wall portion for covering the torsion spring 38 on the outside of the cylindrical portion 22a by plastic molding. In the housing 22, each of the front wall portion 22d and the lower support portion 22r, both of which are made to contact the protective wall portion 23c, is a plate-like portion projecting from an outer peripheral surface of the cylindrical portion 22a and can be molded by drawing out a molding die in the same direction as the spring support projection 22j, thus being capable of being molded as a part of the housing 22, unlike the protective wall portion 23c.

Although the torsion spring 38 of the first embodiment has been illustrated as an element which is to be protected by the protective wall portion 23c of the image-pickup device holder 23 in the above descriptions, the biasing device protective structure using the protective wall portion 23c is applicable to the biasing device of the other embodiments described above. The swing lever 70 in each of the third through fifth embodiments has the merit of not being easily deformed compared with the biasing arm portion 38c of the torsion spring 38 if something were to externally contact the swing lever 70, and accordingly, the biasing device protective structure using the protective wall portion 23c is effective especially when the biasing device is a torsion spring.

Additionally, although FIG. 24 shows a type of lens barrel advancing structure which makes the cam ring 11 move in the optical axis direction via the lead groove portions 22g-1 of the cam ring control grooves 22g that are formed on an inner peripheral surface of the cylindrical portion 22a of the housing 22, the biasing device protective structure according to the present invention is also effective for the lens barrel advancing structure using a helicoidal structure as shown in FIG. 25. Cylindrical portion 522a of the housing 522 shown in FIG. 25 is provided on an inner peripheral surface thereof with a set of three cam ring guide grooves (elements of a rotational ring guide mechanism) 522b. Each cam ring guide groove 522b is composed of a lead groove portion 522b-1 and a circumferential groove portion 522b-2. The cam ring 511 is provided on an annular gear 511a thereof with a set of three guide projections 511b which are engaged in the set of three cam ring guide grooves 522b, respectively. Unlike the type of cam ring advancing structure shown in FIG. 24, the cam ring 511 advances and retracts in the optical axis direction while rotating via the engagement of inner helicoidal threads (elements of the rotational ring guide mechanism) 522c formed on an inner peripheral surface of the cylindrical portion 522a with outer helicoidal threads (elements of the rotational ring guide mechanism) 511c formed on gear teeth of the annular gear 511a of the cam ring 511, not via the engagement of the lead groove portions 522b-1 of the set of three cam ring guide grooves 522b with the guide projections 511b of the cam ring 511. Upon the cam ring 511 being advanced to the limit of forward movement thereof in the optical axis direction via the engagement of the outer helicoidal threads 511c with the inner helicoidal threads 522c, the outer helicoidal threads 511c and the inner helicoidal threads 522c are disengaged from each other while the set of three guide projections 511b are engaged in the set of three circumferential groove portions 522b-2 of the set of three cam ring guide grooves 522b, respectively. Thereafter, the cam ring 511 rotates at a fixed position in the optical axis direction, i.e., without moving in the optical axis direction. In the type of cam ring advancing structure shown in FIG. 25, the biasing device protective structure similar to that shown in FIG. 23 is also effective because the cylindrical portion 522a of the housing 522 is formed into a completely cylindrical body with no portions thereof missing in a circumferential direction for the sake of controlling movement of the cam ring 511.

Although the above described embodiments according to the present invention have been discussed with reference to the accompanied drawings, the present invention is not limited solely to these particular embodiments. For instance, although an optical element moved forward and rearward in the optical axis direction is provided as a lens group for focusing in the above illustrated embodiments, the present invention is also applicable to a position control mechanism for controlling the position of an optical element other than a lens group for focusing.

In addition, although the biasing device in each of the above described embodiments imparts a biasing force forward in the optical axis direction to the optical element holding member, the present invention is not limited to this particular biasing direction of the biasing device. Namely, the biasing device can be of a type which imparts a biasing force rearward in the optical axis direction, i.e., in a direction opposite to that of the optical element holding member.

In addition, although the spring support projection 22j and the swing support projection 22m, which support the torsion spring 38 and the swing lever 70, respectively, are formed on the cylindrical portion 22a of the housing 22 in each of the above described first, third, fourth and fifth embodiments, it is possible for similar swing member support projections to be formed on the protective wall portion 23c of the image-pickup device holder 23.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. An optical element position control mechanism comprising:
    an optical element holding member which holds an optical element of a photographing system and is guided in an optical axis direction;
    a drive mechanism for moving said optical element holding member in said optical axis direction;
    a biasing device including an arm which is swingable about a swing axis, said swing axis being substantially orthogonal to said optical axis, and said arm extending substantially orthogonal to said swing axis and having a free end portion which engages with said optical element holding member to bias said optical element holding member in said optical axis direction; and
    a rotational ring that rotates to move said optical element, wherein said rotational ring is provided separately from said optical element, and wherein said drive mechanism and biasing device are positioned radially outside said rotational ring.

2. The optical element position control mechanism according to claim 1, wherein said biasing device comprises a torsion spring including:
    a coiled portion supported by a support member provided separately from said optical element holding member, a central axis of said coiled portion being substantially coincident with said swing axis;
    a first arm portion which constitutes said arm and extends radially outwards from said coiled portion to be engaged with said optical element holding member at the free end portion thereof; and
    a second arm portion which extends radially outward from said coiled portion to be engaged with said support member,
    wherein said torsion spring varies an amount of resilient deformation thereof in a direction of rotation of said torsion spring about said central axis of said coiled portion in accordance with movement of said optical element holding member.

3. The optical element position control mechanism according to claim 2, wherein an amount of angular displacement of said first arm portion in a rotation direction thereof from a free state of said first arm portion at which said first arm portion is disengaged from said optical element holding member until when said first arm portion comes into a force-applied state at which said first arm portion is engaged with said optical element holding member is greater than an amount of angular displacement of said first arm portion in said rotation direction thereof between a forward movement limit and a rearward movement limit of said optical element holding member in said force-applied state.

4. The optical element position control mechanism according to claim 1, wherein said arm of said biasing device comprises a lever pivoted at one end thereof on a support member, which is provided separately from said optical element holding member, the other end of said lever being engaged with said optical element holding member, and
    wherein said biasing device comprises a lever biasing member for biasing said lever in one of forward and reverse rotational directions about said swing axis.

5. The optical element position control mechanism according to claim 4, wherein said lever biasing member comprises a torsion spring including:

a coiled portion supported by said support member, a central axis of said coiled portion being substantially coincident with said swing axis;

a first arm portion which extends radially outwards from said coiled portion to be engaged with said lever; and a second arm portion which extends radially outwards from said coiled portion to be engaged with a spring-hooked portion of said support member, wherein said torsion spring varies an amount of resilient deformation thereof in a direction of rotation of said torsion spring about said central axis of said coiled portion in accordance with a swing movement of said lever.

6. The optical element position control mechanism according to claim 4, wherein said lever biasing member comprises an extension spring, one end and the other end of which are engaged with said lever and said support member, respectively, a length of said extension spring varying in accordance with a swing movement of said lever.

7. The optical element position control mechanism according to claim 6, wherein a distance from said swing axis to an engaging portion of said lever which engages with said extension spring is smaller than a distance from said swing axis to an engaging portion of said lever which engages with said optical element holding member.

8. The optical element position control mechanism according to claim 1, wherein said swing axis and said free end portion of said arm of said biasing device are positioned outside said rotational ring in one and the other of two spaces provided on both sides of a plane, respectively, which is substantially parallel to said swing axis and lies on said optical axis.

9. The optical element position control mechanism according to claim 1, wherein said drive mechanism comprises:

a screw shaft which rotates on an axis thereof parallel to said optical axis; and a nut which is screw-engaged with said screw shaft and moves forward and rearward in said optical axis direction by forward and reverse rotations of said screw shaft, wherein a position of said optical element holding member in said optical axis direction is determined by contact of said optical element holding member with said nut, and wherein said biasing device biases said optical element holding member in a direction to bring said optical element holding member into contact with said nut.

10. The optical element position control mechanism according to claim 1, wherein said drive mechanism comprises:

a guide member including at least one guide surface inclined with respect to said optical axis direction; and a follower which projects from said optical element holding member to slide on said guide surface, wherein said follower is pressed against said guide surface of said guide member by a biasing force of said biasing device.

11. The optical element position control mechanism according to claim 10, wherein said guide member comprises a cam shaft extending in said optical axis direction, wherein a lead groove serving as a cam groove, in which said follower is slidably engaged, is formed on a peripheral surface of said cam shaft, and wherein said guide surface is positioned inside said lead groove.

12. The optical element position control mechanism according to claim 1, further comprising:

a stationary cylindrical portion positioned inside said biasing device and surrounding said photographing optical system; and a protective wall member provided as a separate element from said stationary cylindrical portion, and fixed to said stationary cylindrical portion to create an accommodation space between an outer peripheral surface of said stationary cylindrical portion and said protective wall member, said biasing device being accommodated in said accommodation space.

13. The optical element position control mechanism according to claim 12, wherein said protective wall member is integral with an image pickup device holder which holds an image pickup device so that said image pickup device lies at an image forming position.

14. The optical element position control mechanism according to claim 12, wherein one of said stationary cylindrical member and said protective wall member comprises a swing movement support projection which supports a swing center portion of said biasing device to allow a swing movement of said arm about said swing axis.

15. The optical element position control mechanism according to claim 12, wherein said protective wall member comprises a side wall portion substantially parallel to a swing plane in which said arm of said biasing device swings about said swing axis.

16. The optical element position control mechanism according to claim 12, wherein said stationary cylindrical member comprises a rotational-ring guide mechanism, provided on an inner peripheral surface of said stationary cylindrical member almost over an entire circumferential range of said stationary cylindrical member, for rotationally guiding said rotational ring, positioned inside said stationary cylindrical member, to control a position of said rotational ring in said optical axis direction.

17. The optical element position control mechanism according to claim 1, wherein said optical element holding member is guided linearly without rotating about said optical axis.

18. The optical element position control mechanism according to claim 1, wherein said drive mechanism comprises a motor and a reduction gear train.

* * * * *